United States Patent
Iizuka et al.

(10) Patent No.: US 9,061,676 B2
(45) Date of Patent: Jun. 23, 2015

(54) VEHICLE CONTROL APPARATUS, VEHICLE, AND MOTOR

(71) Applicant: YAMAHA HATSUDOKI KABUSHIKI KAISHA, Iwata-shi, Shizuoka (JP)

(72) Inventors: Shinya Iizuka, Shizuoka (JP); Yasunori Murayama, Shizuoka (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 0 days.

(21) Appl. No.: 14/347,028

(22) PCT Filed: Sep. 28, 2012

(86) PCT No.: PCT/JP2012/075174
§ 371 (c)(1),
(2) Date: Mar. 25, 2014

(87) PCT Pub. No.: WO2013/047794
PCT Pub. Date: Apr. 4, 2013

(65) Prior Publication Data
US 2014/0229082 A1  Aug. 14, 2014

(30) Foreign Application Priority Data

Sep. 29, 2011 (JP) .................. 2011-214863

(51) Int. Cl.
*B60W 10/06* (2006.01)
*B60W 10/02* (2006.01)
*F02D 41/04* (2006.01)
*F02D 45/00* (2006.01)
(Continued)

(52) U.S. Cl.
CPC ............... *B60W 10/02* (2013.01); *F02D 41/04* (2013.01); *F02D 45/00* (2013.01); *F16H 61/04* (2013.01); *F02B 61/02* (2013.01); *F02D 9/02* (2013.01); *F02D 29/02* (2013.01); *F02D 41/023* (2013.01); *F02D 11/105* (2013.01); *B60W 10/06* (2013.01); *B60W 10/10* (2013.01)

(58) Field of Classification Search
None
See application file for complete search history.

(56) References Cited

U.S. PATENT DOCUMENTS 5,478,293 A     12/1995  Yonezawa
2002/0177504 A1* 11/2002  Pels et al. .................... 477/3
(Continued)

FOREIGN PATENT DOCUMENTS

EP    0 461 578 A1   12/1991
JP    4-46225 A       2/1992
(Continued)

OTHER PUBLICATIONS

Official Communication issued in International Patent Application No. PCT/JP2012/075174, mailed on Nov. 6, 2012.

*Primary Examiner* — Justin Holmes
(74) *Attorney, Agent, or Firm* — Keating & Bennett, LLP

(57) ABSTRACT

A vehicle control apparatus includes an opening degree determination unit that determines the opening degree of a throttle valve based on an accelerator operation amount, and a change suppression unit that reduces a time rate of changing of the opening degree of the throttle valve in a gear change period with a decrease of the rotation speed of the engine, when the opening degree of the throttle valve is changed from a value at which an output torque is greater than a load torque input from a transmission path to an engine toward a boundary value where the output torque is equal to the load torque.

20 Claims, 18 Drawing Sheets

(51) Int. Cl.
 *F16H 61/04* (2006.01)
 *F02D 9/02* (2006.01)
 *F02D 29/02* (2006.01)
 *F02D 41/02* (2006.01)
 *F02D 11/10* (2006.01)
 *B60W 10/10* (2012.01)
 *F02B 61/02* (2006.01)

(56) References Cited

U.S. PATENT DOCUMENTS

| | | | |
|---|---|---|---|
| 2002/0183162 A1* | 12/2002 | Ogawa et al. | 477/70 |
| 2004/0166990 A1 | 8/2004 | Buchanan et al. | |
| 2004/0166991 A1 | 8/2004 | Buchanan et al. | |
| 2004/0172184 A1 | 9/2004 | Vukovich et al. | |
| 2006/0040787 A1* | 2/2006 | Dreher | 477/34 |
| 2009/0084210 A1 | 4/2009 | Tsukada et al. | |
| 2009/0312143 A1* | 12/2009 | Allgaier et al. | 477/5 |
| 2009/0312144 A1* | 12/2009 | Allgaier et al. | 477/5 |
| 2011/0054752 A1 | 3/2011 | Arai | |

FOREIGN PATENT DOCUMENTS

| | | |
|---|---|---|
| JP | 6-330777 A | 11/1994 |
| JP | 10-227355 A | 8/1998 |
| JP | 10-238620 A | 9/1998 |
| JP | 2001-221336 A | 8/2001 |
| JP | 2004-251456 A | 9/2004 |
| JP | 2007-239909 A | 9/2007 |
| JP | 2009-85324 A | 4/2009 |
| JP | 2009-162357 A | 7/2009 |
| JP | 2011-47511 A | 3/2011 |

* cited by examiner

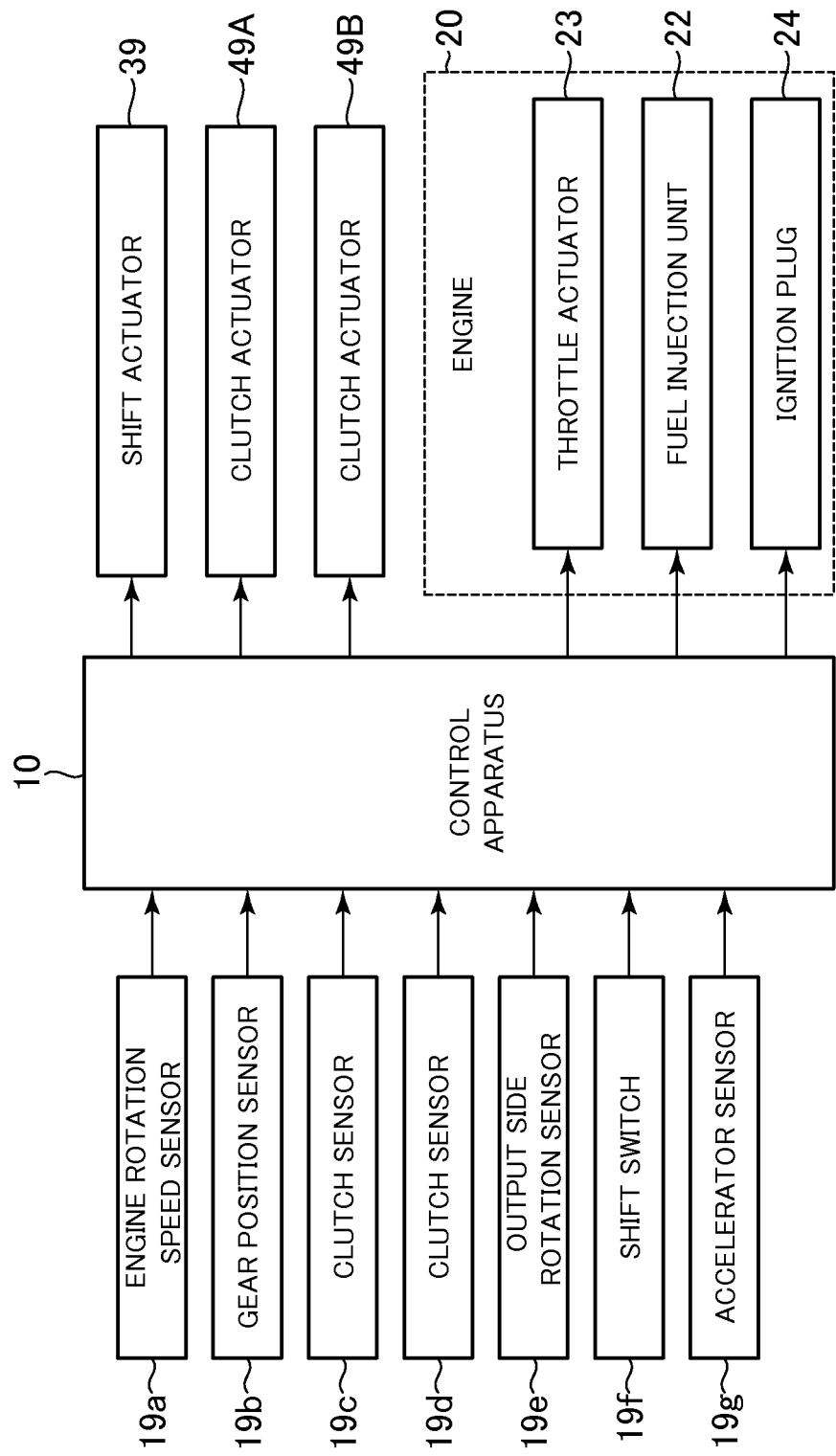

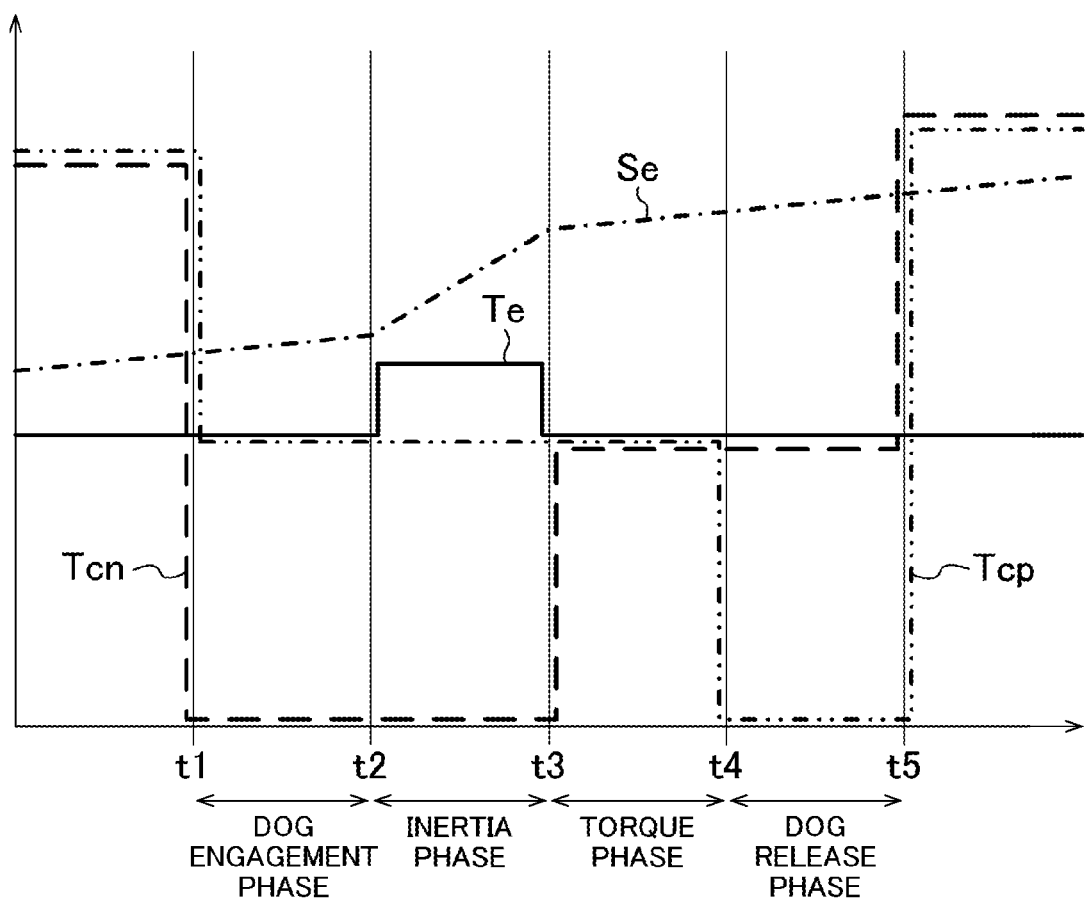

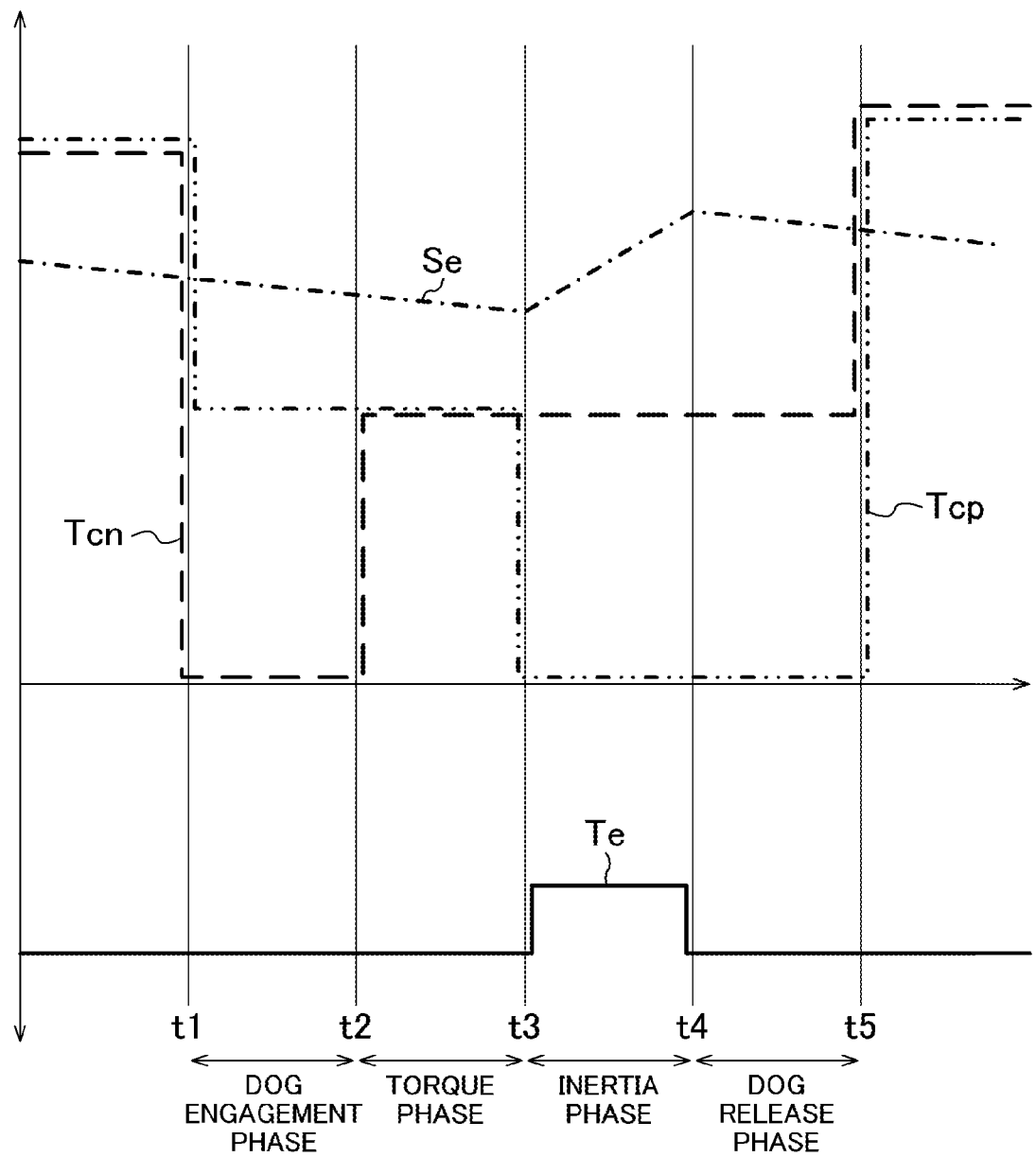

| SHIFT STEP \ ACCELERATOR OPENING DEGREE | 0 | 20 | 40 | 60 | 80 |
|---|---|---|---|---|---|
| 1→2 | 100 | 100 | 100 | 100 | 100 |
| 2→3 | 100 | 100 | 100 | 100 | 100 |
| 3→4 | 100 | 100 | 100 | 100 | 100 |
| 4→5 | 100 | 100 | 100 | 100 | 100 |
| 5→6 | 100 | 100 | 100 | 100 | 100 |

| ENGINE ROTATION SPEED | 2000 | 4000 | 6000 | 8000 | 10000 | 12000 |
|---|---|---|---|---|---|---|
| THROTTLE OPENING DEGREE | 2.0 | 3.0 | 4.0 | 6.0 | 8.0 | 12.0 |

FIG.15

| ENGINE ROTATION SPEED | 2000 | 4000 | 6000 | 8000 | 10000 | 12000 |
|---|---|---|---|---|---|---|
| ACCELERATOR OPENING DEGREE | 5.0 | 6.0 | 8.0 | 10.0 | 12.0 | 20.0 |

FIG.16

| ENGINE ROTATION SPEED | 2000 | 4000 | 6000 | 8000 | 10000 | 12000 |
|---|---|---|---|---|---|---|
| ACCELERATOR OPENING DEGREE | 1.0 | 2.0 | 3.0 | 5.0 | 7.0 | 11.0 |

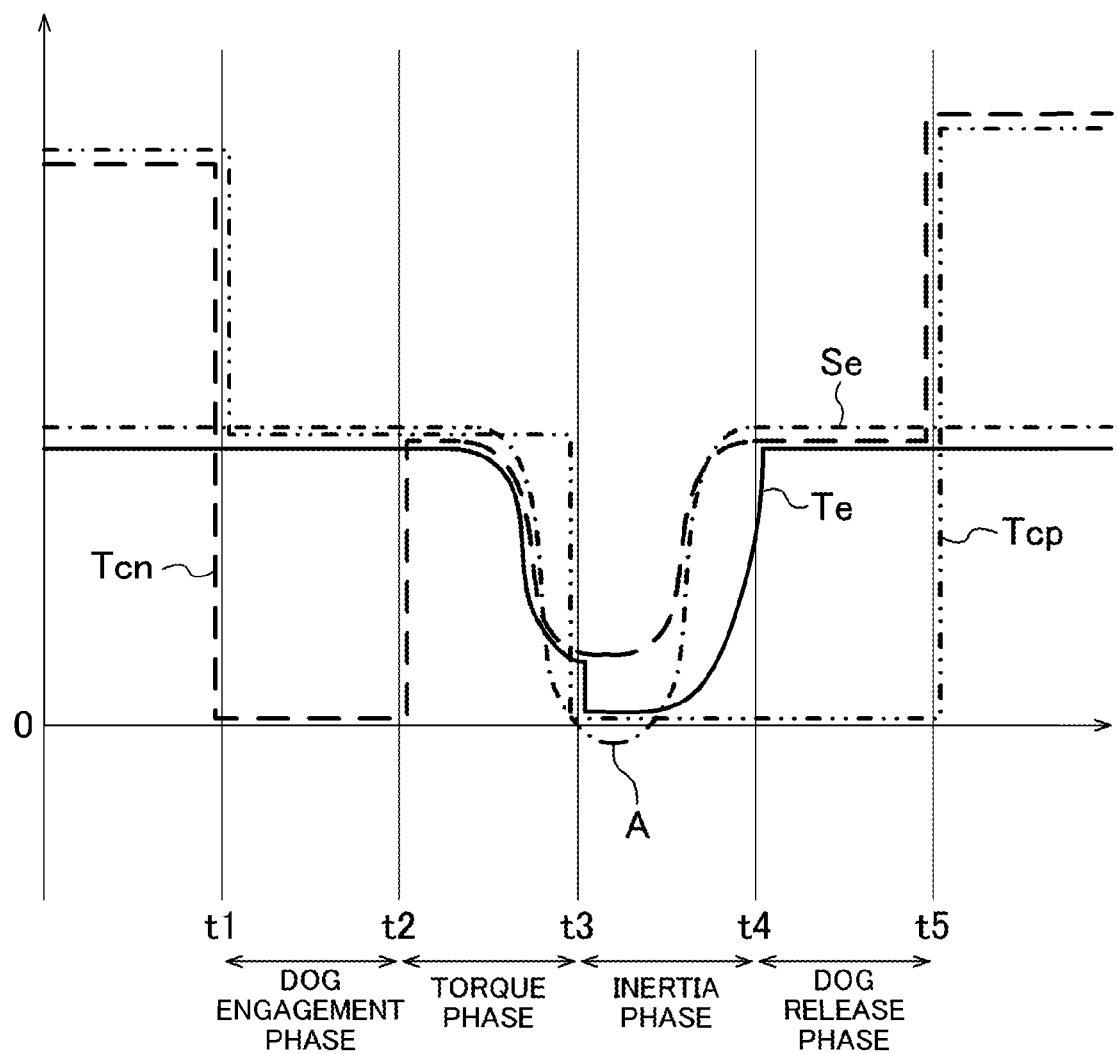

VEHICLE CONTROL APPARATUS, VEHICLE, AND MOTOR

BACKGROUND OF THE INVENTION

1. Field of the Invention

The present invention relates to a vehicle control apparatus, a vehicle, and a motor, and in particular, to transmission control in a twin clutch type vehicle.

2. Description of the Related Art

Conventionally, a twin clutch type vehicle has been known (see Japanese Patent Application Publication No. 2004-251456). A twin clutch type vehicle includes two clutches mounted downstream of the engine to individually receive an output torque from the engine and two dog clutch type transmission mechanisms mounted downstream of the respective clutches and including a common output shaft. In a gear change period, switching control to switch transmission paths of output torque from one clutch and transmission mechanism to another clutch and transmission mechanism and rotation control to change the rotation speed of the engine by ensuring a difference between the output torque of the engine and the torque capacity of the clutch are executed.

In a vehicle, such as a motorcycle or the like, a driver who is used to a manual transmission may unconsciously perform an operation that temporarily closes the accelerator during an up-shift or an operation that temporarily opens the accelerator during a down-shift. These operations are referred to as a blipping operation.

In a twin clutch type vehicle, although a blipping operation by a driver is unnecessary as any clutch remains engaged and the rotation speed of the engine is changed under rotation control, a blipping operation may be performed. For example, when a blipping operation to close the accelerator is performed during an up-shift, an output torque from the engine will decrease, which may cause a shock due to the change from a driving state to a driven state. Meanwhile, when a blipping operation to open the accelerator is performed during a down-shift, an output torque from the engine will increase, which may cause a shock due to the change from a driven state to a driving state. Note here that a driving state refers to a state in which an output torque from the engine to a transmission path is larger than a load torque input from the transmission path to the engine, and a driven state is the opposite state.

In order to prevent the occurrence of a shock due to a blipping operation in a gear change period, there is a method to prevent a throttle valve opening degree from following an accelerator operation amount during a gear change period. According to this method, however, in a case that the driver's operation of the accelerator is not a blipping operation, the throttle valve opening degree may be delayed in following the accelerator operation after the end of a gear change period.

Japanese Patent Application Publication No. H06-330777 describes that a throttle valve opening degree is made not to follow an accelerator operation amount in order to maintain a power-on state (a state in which an output torque is greater than a load torque) during a down-shift. That is, the throttle valve opening degree is fixed as the change from the power-on state to the power-off state is likely caused when a down-shift immediately before the vehicle stops is conducted near the boundary between the power-on state and the power-off state and the rotation speed of the engine increases as a result. That is, the objective in Japanese Patent Application Publication No. H06-330777 differs from an objective in the above described blipping operation. Moreover, it is unlikely that a driver performs a blipping operation in the automatic transmission described in Japanese Patent Application Publication No. H06-330777.

SUMMARY OF THE INVENTION

Preferred embodiments of the present invention have been conceived in view of the above described situation, and provide a vehicle control apparatus, a vehicle, and a motor that prevent shocks due to a blipping operation in a gear change period and swiftly transit to an operation in accordance with an accelerator operation after the end of a gear change period.

A vehicle control apparatus according to a preferred embodiment of the present invention is mounted in a vehicle including an engine, two clutches mounted downstream of the engine to individually receive an output torque from the engine, two actuators to change torque capacities of the respective clutches, two dog clutch type transmission mechanisms mounted downstream of the respective clutches and including a common output shaft, an accelerator operated by a driver, and a throttle valve to adjust an amount of air flowing into the engine. In a gear change period, the control apparatus is programmed to execute a switching control to switch transmission paths of the output torque from one clutch and transmission mechanism to another clutch and transmission mechanism and rotation control to change a rotation speed of the engine by ensuring a difference between the output torque and the torque capacity. The control apparatus includes a target value determination unit that determines a target value of the output torque based on an amount of operation of the accelerator; and a change suppression unit that reduces a time rate of changing of the target value of the output torque in a gear change period with a decrease of the rotation speed of the engine, in case the target value of the output is changed from a value greater than a load torque inputted from the transmission path to the engine toward a boundary value where the output torque is equal to the load torque.

Further, a vehicle control apparatus according to a preferred embodiment of the present invention is mounted in a vehicle including an engine, two clutches mounted downstream of the engine to individually receive an output torque from the engine, two actuators to change torque capacities of the respective clutches, two dog clutch type transmission mechanisms mounted downstream of the respective clutches and including a common output shaft, an accelerator operated by a driver, and a throttle valve to adjust an amount of air flowing into the engine. In a gear change period, the control apparatus is programmed to execute a switching control to switch transmission paths of the output torque from one clutch and transmission mechanism to another clutch and transmission mechanism and rotation control to change a rotation speed of the engine by ensuring a difference between the output torque and the torque capacity. The control apparatus includes a target value determination unit that is programmed to determine a target value of the output torque based on an amount of operation of the accelerator; and a change suppression unit that is programmed to reduce a time rate of changing of the target value of the output torque in a gear change period with an increase of the rotation speed of the engine, in case the target value of the output is changed from a value smaller than a load torque inputted from the transmission path to the engine toward a boundary value where the output torque is equal to the load torque.

A vehicle control apparatus according to a preferred embodiment of the present invention is mounted in a vehicle including an engine, two clutches mounted downstream of the engine to individually receive an output torque from the engine, two actuators to change torque capacities of the respective clutches, two dog clutch type transmission mechanisms mounted downstream of the respective clutches and including a common output shaft, an accelerator operated by a driver, and a throttle valve to adjust an amount of air flowing into the engine. In a gear change period, the control apparatus is programmed to execute a switching control to switch transmission paths of the output torque from one clutch and transmission mechanism to another clutch and transmission mechanism and rotation control to change a rotation speed of the engine by ensuring a difference between the output torque and the torque capacity. The control apparatus includes an opening degree determination unit is programmed to determine an opening degree of the throttle valve based on an amount of operation of the accelerator; and a change suppression unit that is programmed to reduce a time rate of changing of the opening degree of the throttle valve in a gear change period with a decrease of the rotation speed of the engine, when the opening degree of the throttle valve is changed from a value at which the output torque is greater than a load torque inputted from the transmission path to the engine toward a boundary value where the output torque is equal to the load torque.

A vehicle control apparatus according to a preferred embodiment of the present invention is mounted in a vehicle including an engine, two clutches mounted downstream of the engine to individually receive an output torque from the engine, two actuators to change torque capacities of the respective clutches, two dog clutch type transmission mechanisms mounted downstream of the respective clutches and including a common output shaft, an accelerator operated by a driver, and a throttle valve to adjust an amount of air flowing into the engine. In a gear change period, the control apparatus is programmed to execute a switching control to switch transmission paths of the output torque from one clutch and transmission mechanism to another clutch and transmission mechanism and rotation control to change a rotation speed of the engine by ensuring a difference between the output torque and the torque capacity. The control apparatus includes an opening degree determination unit that is programmed to determine an opening degree of the throttle valve based on an amount of operation of the accelerator; and a change suppression unit that is programmed to reduce a time rate of changing of the opening degree of the throttle valve in a gear change period with an increase of the rotation speed of the engine, in case the opening degree of the throttle valve is changed from a value at which the output torque is smaller than a load torque inputted from the transmission path to the engine toward a boundary value where the output torque is equal to the load torque.

A vehicle according to a preferred embodiment of the present invention includes the above described control apparatus. A motor according to a preferred embodiment of the present invention includes the above described control apparatus.

According to preferred embodiments of the present invention, a change between the driving state and the driven state is prevented in a gear change period, such that it is possible to prevent shocks due to a blipping operation in a gear change period. Further, it is possible to achieve swift transit to an operation in accordance with an accelerator operation after the end of a gear change period by reducing a time rate of changing, without fixing the target value of an output torque or the opening degree of a throttle valve during a gear change period.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a block diagram showing a structure of the above mentioned motorcycle, FIGS. 4A to 4D explain an outline of transmission control.

FIG. 6B is a time chart explaining an example of a second control mode.

FIG. 6D is a time chart explaining an example of a fourth control mode.

FIG. 14 shows a map for power on state determination.

FIG. 15 shows a map for reduction determination.

FIG. 16 shows a map for reduction determination.

FIG. 19 is a time chart for a case in which a blipping operation is performed in the first control mode.

DETAILED DESCRIPTION OF THE PREFERRED EMBODIMENTS

Preferred embodiments of a vehicle control apparatus, a vehicle, and a motor according to the present invention will be described with reference to the drawings.

Figure 1:
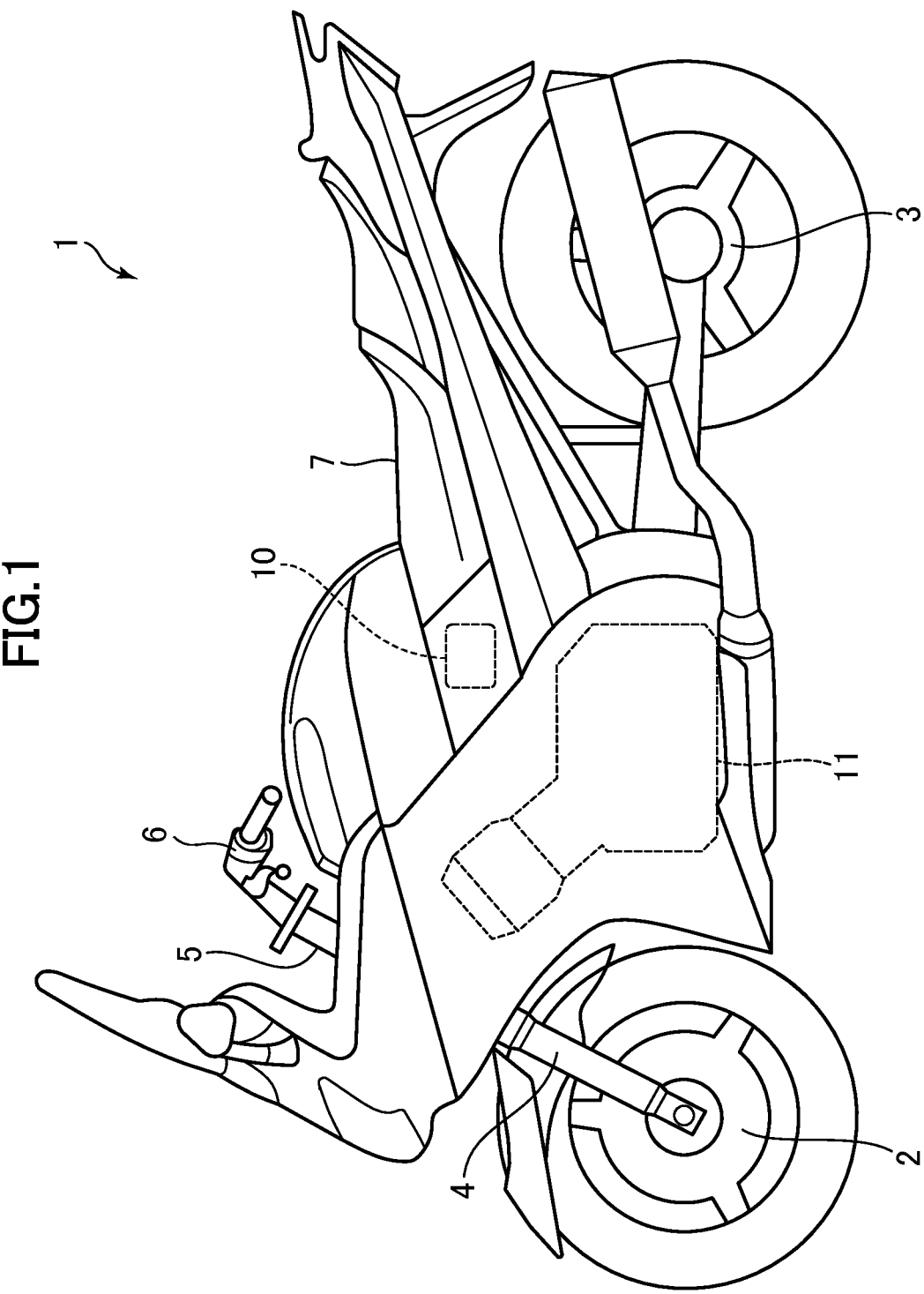
FIG. 1 is a side view of a motorcycle including a control apparatus according to a preferred embodiment of the present invention.
Figure 2:
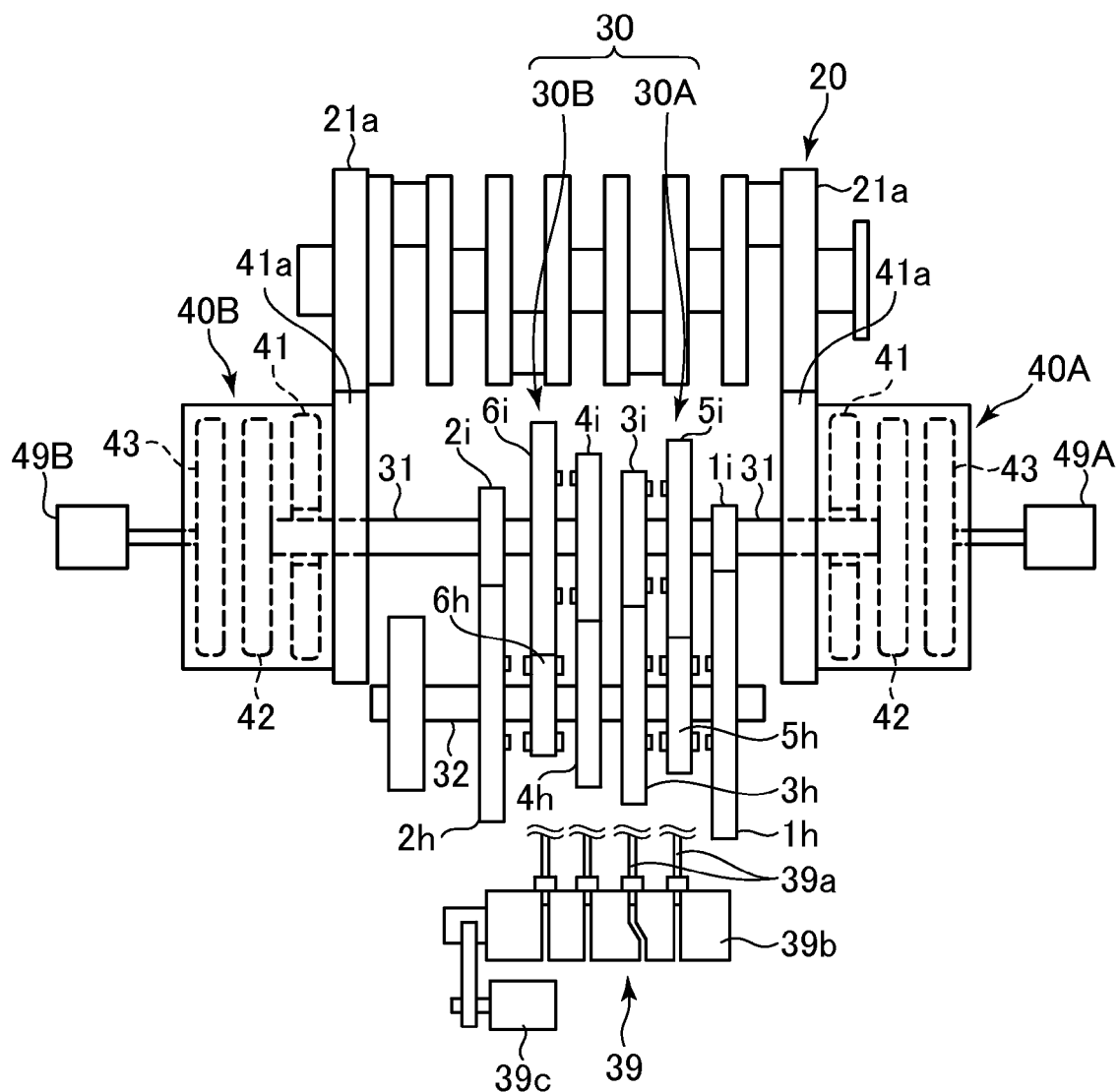
FIG. 2 schematically shows a mechanism provided in a torque transmission path extending from an engine to a rear wheel of the above mentioned motorcycle.

FIG. 1 is a side view of a motorcycle 1 including a control apparatus 10 according to a preferred embodiment of the present invention. FIG. 2 schematically shows a mechanism provided in a torque transmission path extending from an engine 20 to a rear wheel 3. FIG. 3 is a block diagram showing a structure of the motorcycle 1 according to a preferred embodiment of a vehicle of the present invention.

As shown in FIG. 1, the motorcycle 1 includes an engine unit 11 according to a preferred embodiment of a motor of the present invention. A front wheel 2, mounted ahead of the engine unit 11, is supported by the lower end of a front fork 4. A steering shaft 5 rotatably supported in the foremost portion of a vehicle body frame (not shown) is connected to the upper portion of the front fork 4. A steering handle 6 is mounted at the top of the steering shaft 5. The steering handle 6, the front fork 4, and the front wheel 2 are integrally rotatable in the left to right direction with the steering shaft 5 at the center.

A seat 7 for a driver to sit on while straddling the vehicle is mounted behind the steering handle 6. A rear wheel 3 is mounted behind the engine unit 11. A torque output from a transmission 30 (see FIG. 2) is transmitted to the rear wheel 3 by a torque transmitting member (not shown), such as a chain, a belt, a drive shaft, and the like.

As shown in FIG. 2, the engine unit 11 includes the engine 20 and the transmission 30. The motorcycle 1 preferably is a so-called twin clutch type vehicle, and includes a first clutch 40A and a second clutch 40B provided in the engine unit 11. The engine 20 includes a crankshaft 21 that rotates as it is driven by the engine 20.

A torque (the rotation of the crankshaft 21) of the engine 20 is input to the first clutch 40A and the second clutch 40B, respectively. The first clutch 40A and the second clutch 40B each include a driving member 41 that interlinks the rotation of the crankshaft 21. In the example shown in FIG. 2, the crankshaft 21 includes two primary gears 21a. A primary gear 41a is provided for each of the driving member 41 of the first clutch 40A and the driving member 41 of the second clutch 40B. The primary gear 41a is engaged with the primary gear 21a.

The first clutch 40A and the second clutch 40B each include a following member 42 that interlinks an input shaft 31 of a transmission mechanism 30A, 30B to be described below. The first clutch 40A and the second clutch 40B are each a single plate or multi-plate friction clutch, for example. The driving member 41 and the following member 42 are pressed toward each other in the shaft direction, such that a torque is transmitted between them. The driving member 41 includes a friction disk, for example, and the following member 42 includes a clutch disk, for example.

The transmission 30 includes the first transmission mechanism 30A and the second transmission mechanism 30B. The first transmission mechanism 30A and the second transmission mechanism 30B are mounted downstream of the first clutch 40A and the second clutch 40B, respectively. That is, the input shafts 31 are provided in each of the first transmission mechanism 30A and the second transmission mechanism 30B. The input shaft 31 of the first transmission mechanism 30A is connected to the following member 42 of the first clutch 40A so that torque is input to the first transmission mechanism 30A via the first clutch 40A. Meanwhile, the input shaft 31 of the second transmission mechanism 30B is connected to the following member 42 of the second clutch 40B so that torque is input to the second transmission mechanism 30B via the second clutch 40B. The first transmission mechanisms 30A, 30B have a common output shaft 32. As described above, the motorcycle 1 includes two paths as a torque transmission path extending from the crankshaft 21 of the engine 20 to the output shaft 32 of the transmission 30. The first path includes the first transmission mechanism 30A and the first clutch 40A, and the second path includes the second transmission mechanism 30B and the second clutch 40B. The output shaft 32 of the transmission 30 is connected to the axle of the rear wheel 3 via a torque transmission member including a chain, a belt, a shaft, or the like.

The first transmission mechanism 30A and the second transmission mechanism 30B include a plurality of gears 1i to 6i and 1h to 6h, respectively. The gears 1i to 6i are mounted on the input shaft 31, and the gears 1h to 6h are mounted on the output shaft 32. The gears 1i and the gear 1h are engaged with each other, of which the reduction ratio corresponds to the 1st gear. Similarly, the gears 2i to 6i are engaged with the respective gears 2h to 6h, of which the reduction ratios correspond to the respective 2nd to 6th gears. In this example, the first transmission mechanism 30A includes the gears 1i, 3i, 5i, 1h, 3h, 5h, corresponding to odd numbered shift steps, while the second transmission mechanism 30B includes the gears 2i, 4i, 6i, 2h, 4h, 6h, corresponding to even numbered shift steps.

Each of the transmission mechanisms 30A, 30B preferably is a so-called sliding selective type transmission mechanism. Either one of the paired gears (for example, the gears 1i and 1h) corresponding to each shift step is held so as to be rotatable relative to the shaft on which the gear is mounted. Meanwhile, the other of the paired gears is spline engaged with the shaft on which the gear is mounted so as to integrally rotate with the shaft. In this example, the gears 1h, 5i, 3h, 4h, 6i, 2h are held so as to be rotatable relative to the respective shafts on which these gears are mounted. The gears 1i, 5h, 3h, 4h, 6i, 2h are engaged with the respective shafts on which these gears are mounted so as to integrally rotate with the shafts. Thus, at a neutral state (a state with neither shift step set), the gear pairs (5i, 5h) and (6i, 6h) interlock the output shaft 32, and the gear pairs (1i, 1h), (3i, 3h), (4i, 4h), and (2i, 2h) interlock the input shaft 31.

A gear that interlocks the input shaft 31 and a gear that interlocks the output shaft 32 are positioned adjacent to each other in the shaft direction for relative movement in the shaft direction (movable in an approaching direction and a separating direction). Further, the plurality of gears 1i to 6i, 1h to 6h include a gear including a dog clutch provided thereon. A gear that interlocks the input shaft 31 and a gear that interlocks the output shaft 32 can engage with each other by the dog clutch. With the engagement of these two gears, rotation (torque) of the input shaft 31 of the first transmission mechanism 30A or the input shaft 31 of the second transmission mechanism 30B is transmitted to the output shaft 32. In the example shown in FIG. 2, the gears 5h, 3i, 4i, 6h are movable in the shaft direction.

As shown in FIG. 2, the transmission 30 includes a shift actuator 39 to move the gears, which are movable in the shaft direction, 5h, 3i, 4i, 6h (hereinafter referred to as a movable gear) in the shaft direction. The shift actuator 39 includes a plurality of shift forks 39a to be hooked on the respective movable gears, a shift cam 39b to move by rotating the shift fork 39a in the shaft direction, an electric motor 39c to generate a driving force to rotate the shift cam 39b, and the like. The shift actuator 39 moves a movable gear under the control of the control apparatus 10 to shift the shift steps.

Clutch actuators 49A, 49B are provided to move the clutches 40A, 40B under the control of the control apparatus 10 (that is, to put the clutches 40A, 40B in an engaged state or a released state). Each of the clutch actuators 49A, 49B includes an electric motor, for example. A driving force of the electric motor is transmitted to a pressure plate 43 by oil pressure or a rod to press the driving member 41 and the following member 42 toward each other in the shaft direction.

As shown in FIG. 3, a fuel injection unit 22, a throttle actuator 23, and an ignition plug 24 are provided in the engine 20. The fuel injection unit 22 supplies fuel to the engine 20 for combustion in a combustion chamber of the engine 20. The throttle actuator 23 controls the opening degree of a throttle valve (not shown) to adjust the amount of air flowing in an intake path of the engine 20. The ignition plug 24 ignites the mixture of the fuel and the air flowing in the combustion chamber of the engine 20. The amount of fuel injected by the fuel injection unit 22, an ignition timing by the ignition plug 24, and a throttle valve opening degree (hereinafter referred to as a throttle opening degree) are controlled by the control apparatus 10.

The motorcycle 1 includes an engine rotation speed sensor 19a, a gear position sensor 19b, clutch sensors 19c, 19d, an output side rotation sensor 19e, a shift switch 19f, and an accelerator sensor 19g. These sensors are connected to the control apparatus 10.

The engine rotation speed sensor 19a includes a rotation sensor to output a pulse signal having a frequency in accordance with the engine rotation speed. The control apparatus 10 calculates the engine rotation speed (the rotation speed of the crankshaft 21) based on an output signal of the engine rotation speed sensor 19a.

The gear position sensor 19b includes a potentiometer to output a voltage signal in accordance with the rotation angle of the shift cam 39, for example. The control apparatus 10 determines the positions of the movable gears 5h, 3i, 4i, 6h and the current shift step based on an output signal from the gear position sensor 19b.

The output side rotation sensor 19e is mounted on the axle of the rear wheel 3 or the output shaft 32. The output side rotation sensor 19e is a rotation sensor that outputs a pulse signal having a frequency corresponding to the rotation speed of the rear wheel 3 or of the output shaft 32, for example. The control apparatus 10 calculates the vehicle speed or the rotation speed of the output shaft 32 based on an output signal from the output side rotation sensor 19e.

The shift switch 19f is a switch operated by a driver, and inputs a transmission instruction made by the driver (a signal indicating a shift-up instruction to increase the shift step and a signal indicating a shift-down instruction to decrease the shift step) to the control apparatus 10. As the shift switch 19f, a shift-up switch and a shift-down switch are preferably both provided.

The accelerator sensor 19g outputs a signal in accordance with the amount of operation (a rotation angle) of an accelerator grip (not shown) provided on the steering handle 6. The accelerator sensor 19g includes a potentiometer, for example. The control apparatus 10 determines the amount of operation (an accelerator operation amount) of the accelerator grip based on an output signal from the accelerator sensor 19g.

The clutch sensor 19c is a sensor that determines the transmission torque capacity (the maximum torque that can be transmitted by the first clutch 40A in the current state (a current engaged degree)) of the first clutch 40A. Further, the clutch sensor 19d is a sensor that determines the transmission torque capacity (the maximum torque that can be transmitted by the second clutch 40B in the current state (a current engaged degree)) of the second clutch 40B. The transmission torque capacity is maximized when the clutches 40A, 40B are in an engaged state, and minimized (for example, 0 Nm) when the clutches 40A, 40B are in a released state. Each of the clutch sensors 19c, 19d determines, for example, a displaced amount of the pressure plate 43.

The transmission torque capacity corresponds to the position (a clutch stroke amount) of the clutch 40A, 40B. Each clutch sensor 19c, 19d is a potentiometer that outputs a signal in accordance with the position of the clutch 40A, 40B, for example (a signal in accordance with an operation amount of the clutch actuator 49A, 49B). The control apparatus 10 determines the transmission torque capacity, based on the clutch position determined based on an output signal from the clutch sensor 19c, 19d. For example, the control apparatus 10 calculates the transmission torque capacity, based on the clutch position determined, using a map that correlates a clutch position and a transmission torque capacity or a calculation expression.

In a structure in which the clutch actuator 49A, 49B moves the clutch 40A, 40B by oil pressure, the transmission torque capacity corresponds to an oil pressure applied to the clutch 40A, 40B (hereinafter referred to as a clutch pressure). In such a structure, each clutch sensor 19c, 19d may be a hydraulic sensor that outputs a signal in accordance with the clutch pressure. In this case, the control apparatus 10 determines the transmission torque capacity based on the clutch pressure determined based on an output signal from the clutch sensor 19c, 19d. For example, the control apparatus 10 calculates the transmission torque capacity, based on the clutch pressure determined, using a map that correlates a clutch pressure and a transmission torque capacity, or a calculation expression.

Further, the transmission torque capacity corresponds to a force applied from the clutch actuator 49A, 49B to the clutch 40A, 40B (a pressing force applied to the driving member 41 and the following member 42). With the force applied from each clutch actuator 49A, 49B to the respective clutch 40A, 40B, a portion receiving the force (for example, the case of the clutch 40A, 40B, or the like) is deformed. In view of the above, each clutch sensor 19c, 19d may be a deformation sensor that outputs a signal in accordance of the amount of deformation of the portion receiving a force from the clutch 40A, 40B. In this case, the control apparatus 10 determines the transmission torque capacity based on the deformation determined based on an output signal from the clutch sensor 19c, 19d. For example, the control apparatus 10 calculates the transmission torque capacity, based on the deformation determined, using a map that correlates a clutch deformation and a transmission torque capacity or a calculation expression.

The control apparatus 10 includes a CPU (Central Processing Unit), and a memory, such as a ROM (Read Only Memory), a RAM (Random Access Memory), and the like. The control apparatus 10 executes in the CPU programs stored in the memory to control the engine 20, the transmission 30, and the clutches 40A, 40B.

Specifically, the control apparatus 10 is programmed to set a target value for the output torque of the engine 20 (hereinafter referred to as a target engine torque), and drive the throttle actuator 23, the fuel injection unit 22, and the ignition plug 24 such that the actual output torque becomes equal to the target engine torque. Further, the control apparatus 10 is programmed to set a target value (hereinafter referred to as a target torque capacity) for the transmission torque capacity of the first clutch 40A and for the transmission torque capacity of the second clutch 40B, and move the clutch actuators 49A, 49B such that the respective actual transmission torque capacities become equal to the respective target torque capacities. Still further, the control apparatus 10 is programmed to move the shift actuator 39 such that each of the first transmission mechanism 30A and the second transmission mechanism 30B sets a shift step in accordance with a transmission instruction.

Below, an outline of transmission control will be described. In the description below, of the first clutch 40A and the second clutch 40B, a clutch that transmits the torque of the engine 20 before transmission is conducted is referred to as a prior clutch, and the other clutch (that is, a clutch that starts transmission of the torque of the engine 20 in response to a transmission instruction) is referred to as a next clutch. Similarly, of the first transmission mechanism 30A and the second transmission mechanism 30B, a transmission mechanism that transmits the torque of the engine 20 before transmission is conducted is referred to as a prior transmission mechanism, and the other transmission mechanism (that is, a transmission mechanism that starts transmission of the torque of the engine 20 in response to a transmission instruction) is referred to as a next transmission mechanism.

FIGS. 4A to 4D explain an outline of the transmission control. In the diagram, the transmission mechanisms 30A, 30B and the clutches 40A, 40B shown in FIG. 2 are shown more simplified. Specifically, in this diagram, the clutch Cp represents a prior clutch, and the clutch Cn represents a next clutch. Further, the transmission mechanism Tp represents a prior transmission mechanism, and the transmission mechanism Tn represents a next transmission mechanism. Still further, the gear Gp1 of the prior transmission mechanism Tp represents a movable gear (5$h$, 3$i$, 4$i$, or 6$h$) that transmits a torque at a previous shift step, and the gear Gp2 represents a stationary gear (1$h$, 5$i$, 3$h$, 4$h$, 6$i$, or 2$h$) that transmits a torque at the previous shift step. Yet further, the gear Gn1 of the next transmission mechanism Tn represents a movable gear that transmits a torque at the next shift step, and the gear Gn2 represents a stationary gear that transmits a torque at the next shift step. In this diagram, for simplification, one gear is shown as to each of the movable gears Gp1, Gn1 and one gear is shown as to each of the stationary gears Gp2, Gn2 are shown. In this diagram, the stationary gears Gp2, Gn2 are fixed to the output shaft 32 (that is, in spline engagement with the output shaft 32) to integrally rotate with the output shaft 32. Meanwhile, the movable gears Gp1, Gn1 can freely rotate relative to the output shaft 32. The movable gears Gp1, Gn1 are engaged with the gears Gp3, Gn3, respectively, fixed to the respective input shafts 31, and interlink the rotation of the respective gears Gp3, Gn3 and the respective input shafts 31.

Figure 4A:
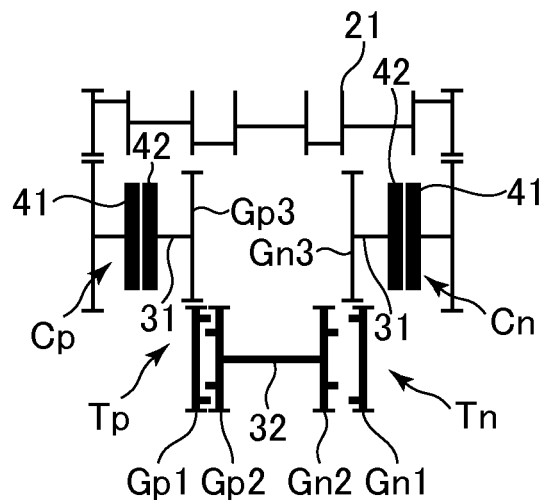
Figure 4B:
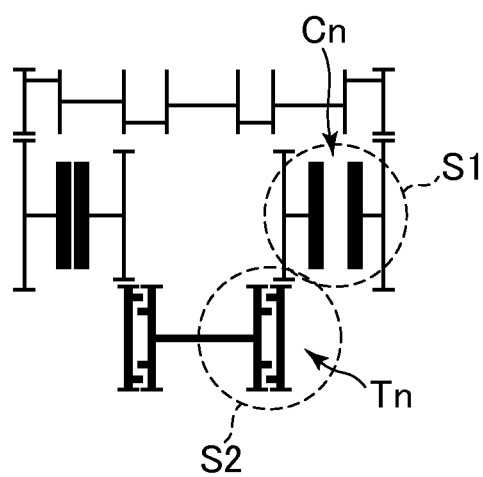
Figure 4C:
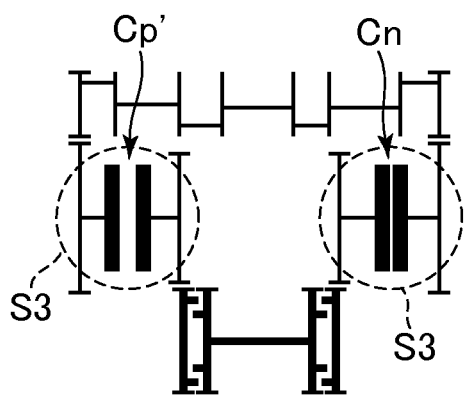
Figure 4D:
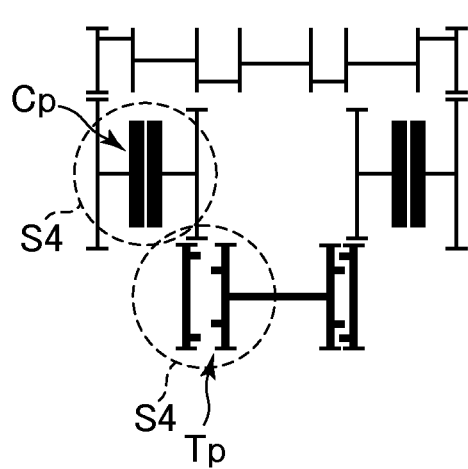

As shown in FIG. 4A, in normal running, the two clutches Cp, Cn are set in an engaged state (a state with the maximum transmission torque capacity). In the prior transmission mechanism Tp, the movable gear Gp1 and the stationary gear Gp2 corresponding to the previous shift step are engaged with each other by a dog clutch. In the next transmission mechanism Tn, all movable gears are placed in a neutral position (a position with no stationary gear engaged). Therefore, the torque of the engine 20 is transmitted to the rear wheel 3 via one of the two torque transmission paths (the prior clutch Cp and the prior transmission mechanism Tp). While torque transmission in the other path is disconnected in the next transmission mechanism Tn.

When a transmission instruction is made, the control apparatus 10 switches the paths to transmit a torque from one to the other. That is, the control apparatus 10 causes the movable gear Gn1 and the stationary gear Gn2 of the next transmission mechanism Tn to be engaged with each other, and puts the movable gear Gp1 of the prior transmission mechanism Tp in a neutral position. Specifically, the transmission mechanisms Tp, Tn and the clutches Cp, Cn are moved as described below under transmission control. Specifically, the control apparatus 10 initially releases the engagement of the next clutch Cn, as indicated by S1 in FIG. 4B, and then moves the movable gear Gn1 of the next transmission mechanism Tn so as to be engaged with the adjacent stationary gear Gn2 (a so-called dog engagement phase), as indicated by S2. Thereafter, the control apparatus 10 causes the next clutch Cn to return from a released state to an engaged state, as indicated by S3 in FIG. 4C, and also puts the prior clutch Cp in a released state (a so-called torque phase). Finally, the control apparatus 10 moves the movable gear Gp1 of the prior transmission mechanism Tp to a neutral position, as indicated by S4 in FIG. 4D, and then puts the prior clutch Cp in the engaged state (a so-called dog release phase).

In execution of such transmission control, it may be necessary to conduct rotation control (a so-called inertia phase) to have the rotation speed of the driving member 41 of the prior clutch Cp or the next clutch Cn to be equal to that of the following member 42 before or after the torque phase (see S3 in FIG. 4C) in order to prevent increase and decrease of a driving force of the rear wheel 3 (a transmission shock) during transmission. A plurality of control modes for the transmission control by the control apparatus 10 to be described below are roughly grouped into ones in which the torque phase precedes the inertia phase, and ones in which the inertia phase precedes the torque phase.

Figure 5:
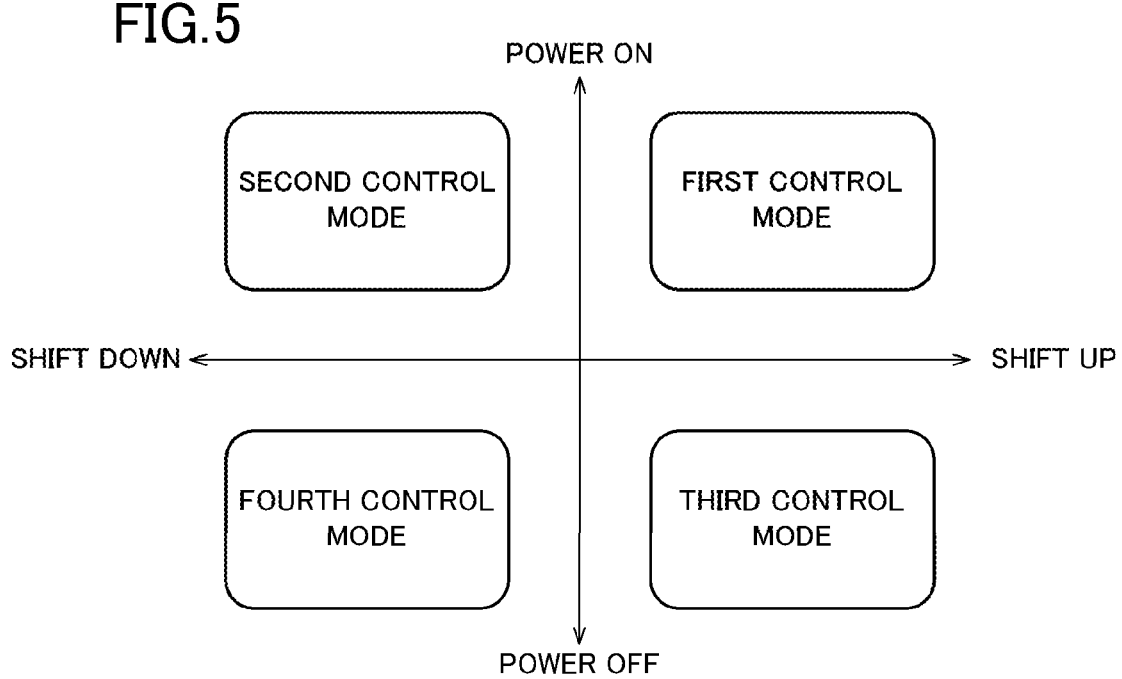
FIG. 5 shows a plurality of control modes of the transmission control.

FIG. 5 shows the plurality of control modes for transmission control by the control apparatus 10. The control apparatus 10 includes, for example, four control modes for transmission control. The first control mode is for shift up control with the accelerator open (power on shift up control). The second control mode is for shift down control with the accelerator open (power on shift down control). The third control mode is for shift up control with the accelerator closed (power off shift up control). The fourth control mode is for shift down control with the accelerator closed (power off shift down control).

Below, the respective control modes will be described. FIGS. 6A to 6D show time charts explaining examples of the respective control modes.

First Control Mode

Figure 6A:
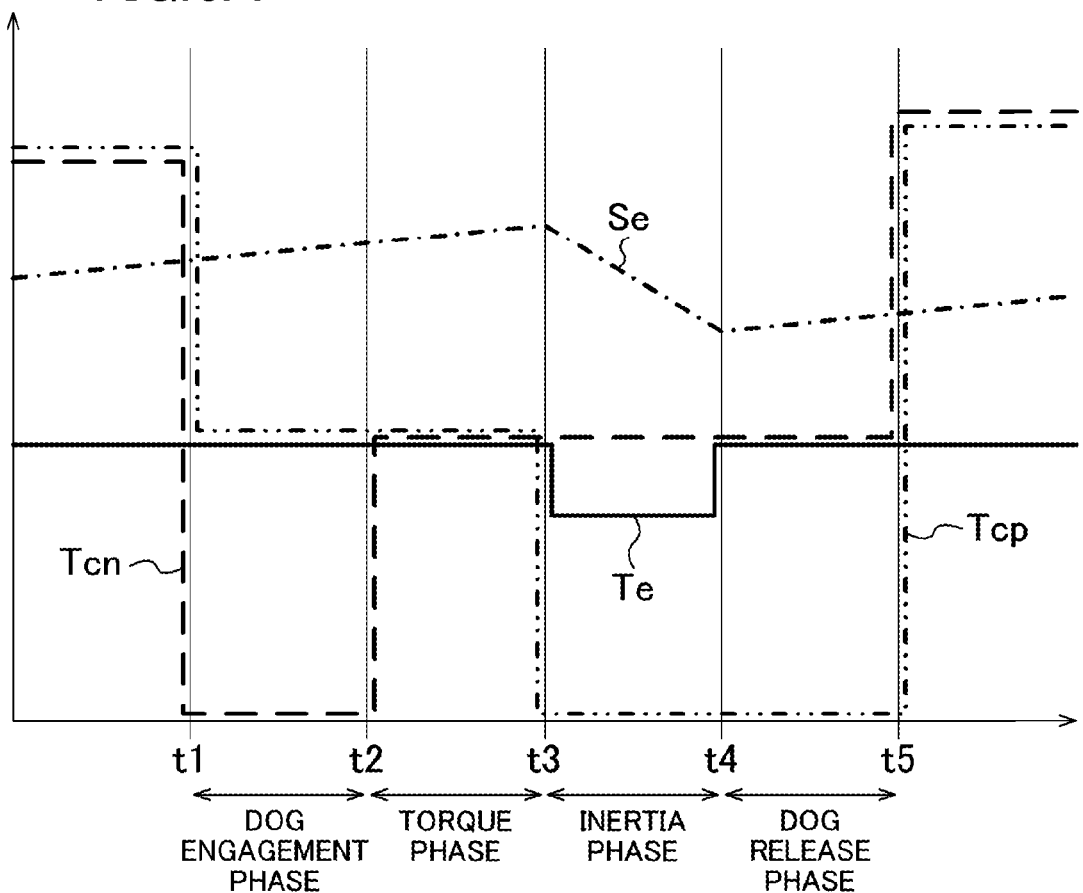
FIG. 6A is a time chart explaining an example of a first control mode.

FIG. 6A is a time chart explaining an example of the first control mode (power on shift up control) executed by the control apparatus 10. In the diagram, the alternate long and short dash line indicates the engine rotation speed Se, the solid line indicates the target engine torque Te, the broken line indicates the target torque capacity Tcn of the next clutch Cn, and the long dashed double-short dashed line indicates the target torque capacity Tcp of the prior clutch Cp. Of these, the broken line and the long dashed double-short dashed line each take a value obtained by dividing the target torque capacity by a primary reduction ratio. In the diagram, the respective lines are shown displaced from each other in the vertical or horizontal direction so as to avoid overlapping. In the first control mode, the torque phase and the inertia phase are executed in this order.

Initially, the control apparatus 10 starts the dog engagement phase (t1). Specifically, the control apparatus 10 changes the next clutch Cn from the engaged state to the released state. The engaged state refers to a state with the maximum transmission torque capacity, and the released state refers to a state with the minimum transmission torque capacity (for example, 0 Nm). Further, the control apparatus 10 drives the shift actuator 39 to move the movable gear Gn1 of the next transmission mechanism Tn toward the stationary gear Gn2. Still further, the control apparatus 10 changes the prior clutch Cp from the engaged state to a half-engaged state. Here, the target torque capacity Tcp of the prior clutch Cp is decreased to a value corresponding to the target engine torque Te.

Thereafter, the control apparatus 10 starts the torque phase to switch the paths to transmit the torque of the engine 20 (t2). The control apparatus 10 changes the prior clutch Cp from the half-engaged state to the released state, and changes the next clutch Cn from the released state to the half-engaged state. Specifically, the control apparatus 10 increases the target torque capacity Tcp of the next clutch Cn to a value corresponding to the target engine torque Te.

Thereafter, the control apparatus 10 starts the inertia phase to decrease the engine rotation speed Se (t3). Specifically, the control apparatus 10 decreases the target engine torque Te so as to become relatively lower than the target torque capacity Tcn of the next clutch Cn to decrease the engine rotation speed Se. In other words, the control apparatus 10 increases the target torque capacity Tcn of the next clutch Cn so as to become relatively higher than the target engine torque Te to decrease the engine rotation speed Se.

Thereafter, the control apparatus 10 starts the dog release phase (t4). Specifically, the control apparatus 10 drives the shift actuator 39 to move the movable gear Gp1 of the prior transmission mechanism Tp toward the neutral position. Thereafter, the control apparatus 10 returns the prior clutch Cp and the next clutch Cn to the engaged state (t5). With the above, transmission control in the first control mode is finished.

Second Control Mode

FIG. 6B is a time chart explaining an example of the second control mode (power on shift down control) executed by the control apparatus 10. Below, difference from the above described control mode will be mainly described. In the second control mode, the inertia phase and the torque phase are executed in this order.

The control apparatus 10 starts the inertia phase, following the dog engagement phase, to increase the engine rotation speed Se (t2). Specifically, the control apparatus 10 increases the engine torque Te so as to become relatively higher than the target torque capacity Tcp of the prior clutch Cp to increase the engine rotation speed Se. In other words, the control apparatus 10 increases the target torque capacity Tcp of the prior clutch Cp so as to become relatively higher than the target engine torque Te to increase the engine rotation speed Se. Thereafter, the control apparatus 10 executes the torque phase and the dog release phase. With the above, transmission control in the second control mode is finished.

Third Control Mode

Figure 6C:
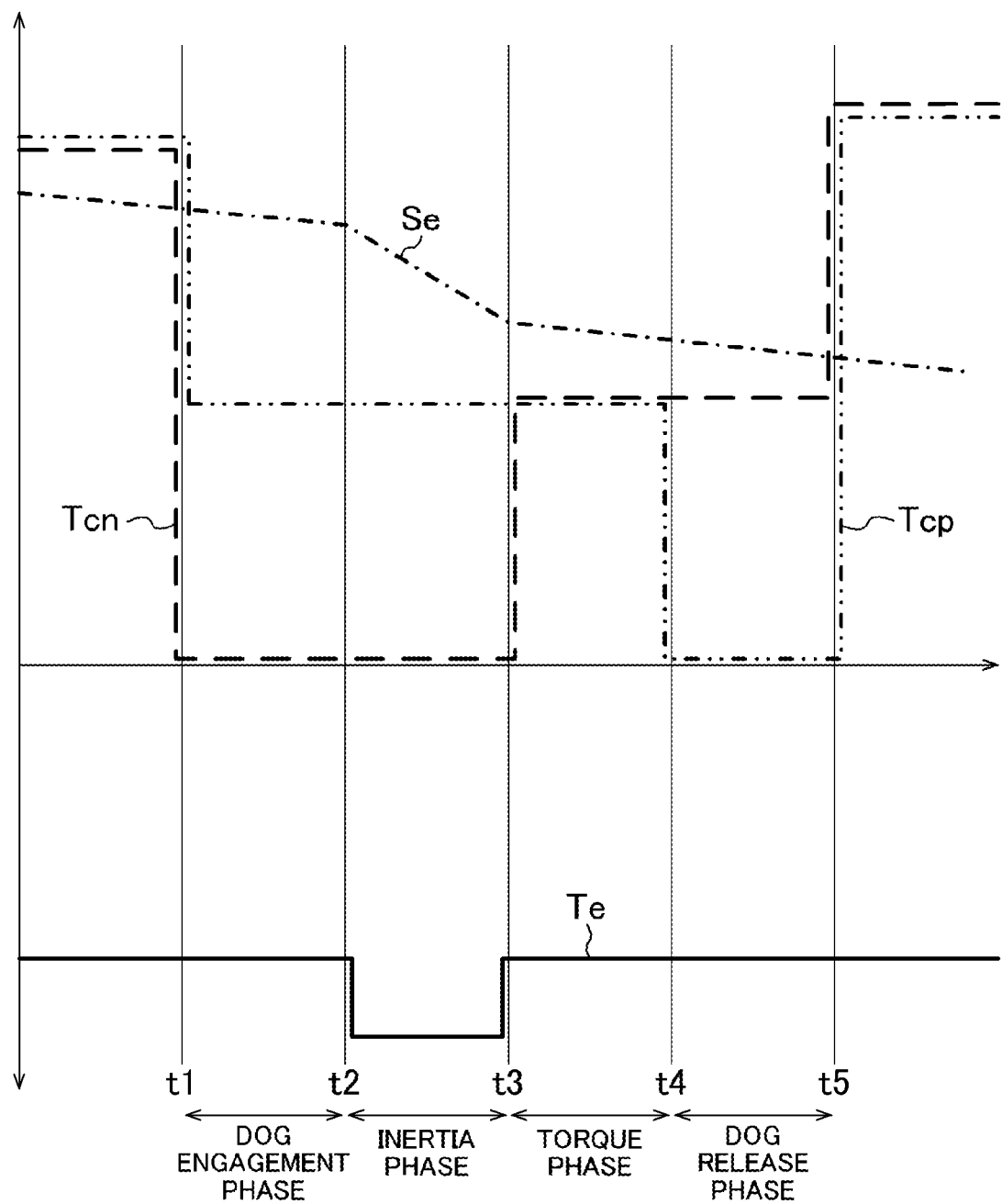
FIG. 6C is a time chart explaining an example of a third control mode.

FIG. 6C is a time chart explaining an example of the third control mode (power off shift up control) executed by the control apparatus 10. Below, difference from the above described control modes will be mainly described. In the third control mode, the inertia phase and the torque phase are executed in this order. In the third control mode, the target engine torque Te takes a negative value.

The control apparatus 10 starts the inertia phase, following the dog engagement phase, to decrease the engine rotation speed Se (t2). Specifically, the control apparatus 10 increases the absolute value of the target engine torque Te so as to become relatively larger than the target torque capacity Tcp of the prior clutch Cp (that is, by decreasing the target engine torque Te) to decrease the engine rotation speed Se. In other words, the control apparatus 10 decreases the target torque capacity Tcp of the prior clutch Cp so as to become relatively lower than the absolute value of the target engine torque Te to decrease the engine rotation speed Se. Thereafter, the control apparatus 10 executes the torque phase and the dog release phase. With the above, transmission control in the third control mode is finished.

Fourth Control Mode

FIG. 6D is a time chart explaining an example of the fourth control mode (power off shift down control) executed by the control apparatus 10. Below, difference from the above described control modes will be mainly described. In the fourth control mode, the torque phase and the inertia phase are executed in this order. In the fourth control mode, the target engine torque Te takes a negative value.

The control apparatus 10 starts the inertia phase, following the torque phase, to increase the engine rotation speed Se (t3). Specifically, the control apparatus 10 decreases the absolute value of the target engine torque Te so as to become relatively lower than the target torque capacity Tcn of the next clutch Cn (that is, by increasing the target engine torque Te) to increase the engine rotation speed Se. In other words, the control apparatus 10 increases the target torque capacity Tcn of the next clutch Cn so as to become relatively higher than the absolute value of the target engine torque Te to increase the engine rotation speed Se. Thereafter, the control apparatus 10 executes the dog release phase. With the above, transmission control in the fourth control mode is finished.

Figure 7:
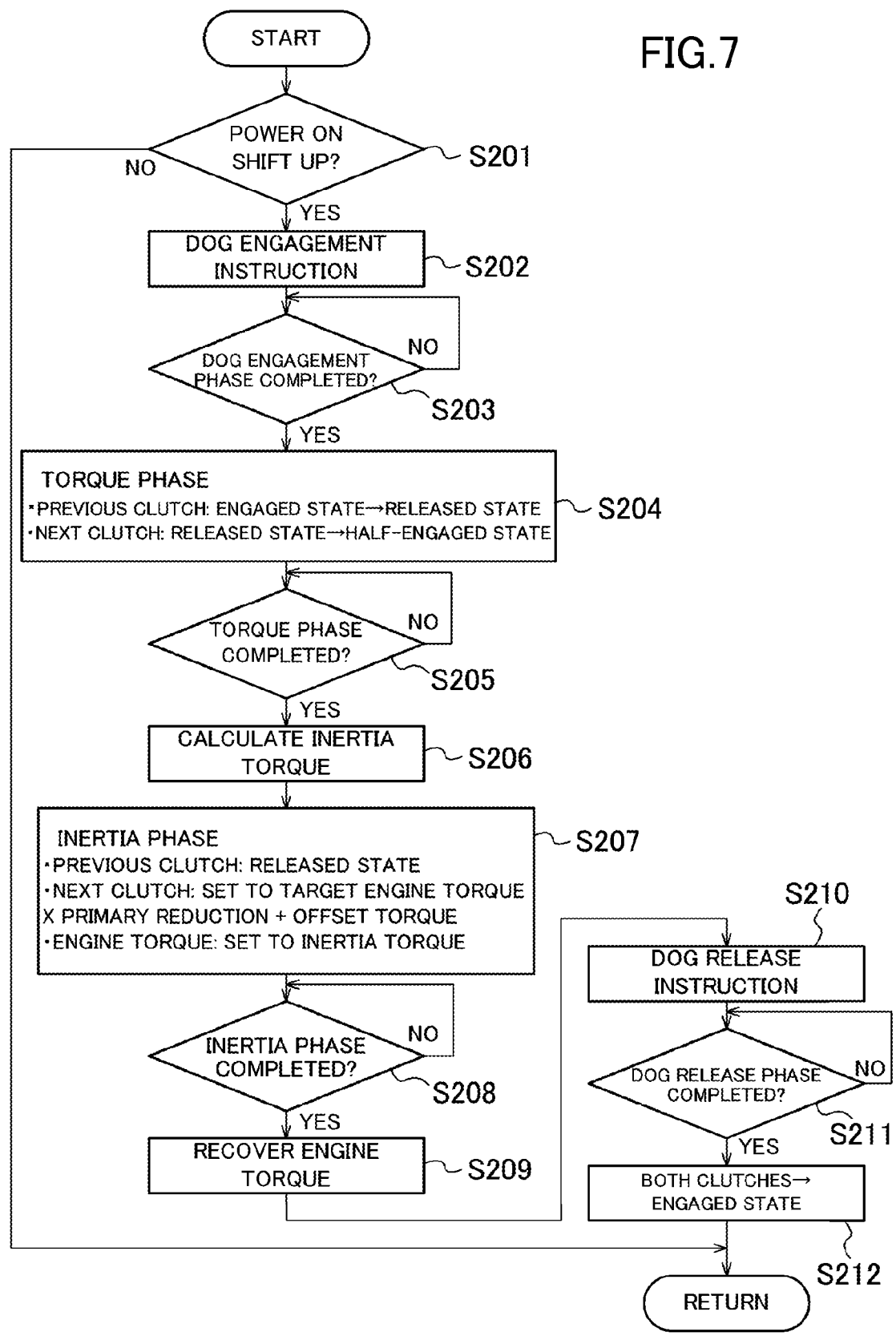
FIG. 7 is a flowchart showing an example of an operation in the first control mode.

Below, as a representative of the first to fourth control modes (FIGS. 6A to 6D), a specific example of an operation in the first control mode (power on shift up control) will be described. FIG. 7 is a flowchart showing an example operation in the first control mode.

At S201, the control apparatus 10 determines whether or not the transmission control is in the first control mode (power on shift up control). When the transmission control is not in the first control mode (S201: NO), the control apparatus 10 finishes the processing.

At S202, the control apparatus 10 outputs a dog engagement instruction to execute the dog engagement phase (t1 in FIG. 6). A dog engagement instruction includes an instruction to change the next clutch Cn from the engaged state to the released state and an instruction to move the movable gear Gn1 of the next transmission mechanism Tn toward the stationary gear Gn2. A dog engagement instruction further includes an instruction to change the prior clutch Cp from the engaged state to the half-engaged state. Specifically, the target torque capacity of the prior clutch Cp is set such that a value obtained by dividing it by a primary reduction ratio becomes equal to the target engine torque.

At S203, the control apparatus 10 determines whether or not the dog engagement phase has been completed. As a determination method, the following method is possible. For example, when it is determined, based on a signal from the gear position sensor 19b, that the shift cam 39b is positioned within a range corresponding to a dog engagement, it is determined that the dog engagement phase has been completed. Further, in a structure in which a sensor that determines the rotation speed of the input shaft 32 is provided, completion of the dog engagement phase may be determined when the difference between a value obtained by dividing the engine rotation speed by a primary reduction ratio and the input shaft rotation speed is included in a range corresponding to dog engagement.

At S204, the control apparatus 10 executes the torque phase (t2 in FIG. 6). At the start of the torque phase, the control apparatus 10 outputs an instruction to change the prior clutch Cp to the released state and an instruction to change the next clutch Cn to the half-engaged state. Specifically, the target torque capacity of the next clutch Cn is set such that a value obtained by dividing the target torque capacity by a primary reduction ratio becomes equal to the target engine torque.

At S205, the control apparatus 10 determines whether or not the torque phase has been completed. Specifically, whether or not the transmission torque capacities of the clutches 40A, 40B have reached the respective target torque capacities is determined based on the signals from the respective clutch sensors 19c, 19d.

Figures 8, 9:
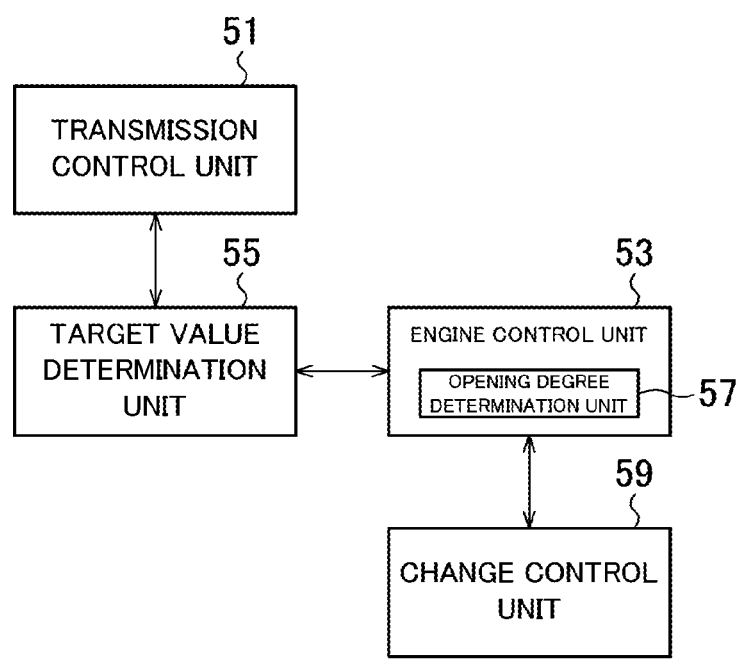
FIG. 8 shows an example of content of a table concerning durations of inertia phases.
FIG. 9 is a block diagram showing an example of a functional structure of a control apparatus.

At S206, the control apparatus 10 calculates an inertia torque. An inertia torque is a target engine torque applied at the inertia phase (Te in FIG. 6). An inertia torque is obtained, using, for example, an expression of (current engine rotation speed−engine rotation speed after transmission)/inertia phase duration×inertia around crank. An inertia phase duration is read from a table, such as shown in FIG. 8, for example, that correlates an inertia phase duration, a shift step, and an accelerator opening degree. Further, an inertia around crank is an inertia due to an object present around the crank shaft 21, and can be obtained in advance at the stage of designing the engine 20, or the like.

At S207, the control apparatus 10 executes the inertia phase to decrease the engine rotation speed Se (t3 in FIG. 6). With the inertia phase started, the target engine torque is set to the inertia torque calculated at S206. Further, the target transmission torque of the prior clutch Cp is set to the minimum value (for example, 0 Nm). Still further, the target transmission torque of the next clutch Cn is set to a value obtained by multiplying the target engine torque determined based on the accelerator opening degree by a primary reduction ratio and then adding an offset torque. Note here that an offset torque takes a value that addresses a situation in which the inertial phase does not progress as the target transmission torque Tcn of the next clutch Cn differs from the actual transmission torque capacity, being, for example, a value determined in accordance with a period of time elapsed after the start of S207, for example.

At S208, the control apparatus 10 determines whether or not the inertia phase has been completed. For example, it is determined that the inertia phase has been completed when |drive shaft rotation speed×gear ratio after transmission×primary reduction ratio−engine rotation speed|<threshold is met. Further, when the expression, for example, (drive shaft rotation speed×gear ratio before transmission×primary reduction ratio−engine rotation speed)/(drive shaft rotation speed×(gear ratio before transmission−gear ratio after transmission)×primary reduction ratio)>threshold is met, completion of the inertia phase may be determined. Still further, completion of the inertial phase may be determined when one or both of the above mentioned expressions is/are met.

At S209, the control apparatus 10 returns the target engine torque to a normal value obtained based on the accelerator opening degree.

At S210, the control apparatus 10 outputs a dog release instruction to execute the dog release phase (t4 in FIG. 6). A dog release instruction includes an instruction to move the movable gear Gn1 of the prior transmission mechanism Tp to the neutral position.

At S211, the control apparatus 10 determines whether or not the dog release phase has been completed. As a determination method, the following method is possible. For example, when it is determined, based on a signal from the gear position sensor 19*b*, that the shift cam 39*b* is positioned in a range corresponding to dog release, completion of the dog release phase is determined. Further, in a structure in which a sensor that determines the rotation speed of the input shaft 32 is provided, completion of the dog release phase may be determined when the difference between a value obtained by dividing the engine rotation speed by a primary reduction ratio and the input shaft rotation speed is in a range corresponding to dog release.

At S212, the control apparatus 10 outputs an instruction to change the prior clutch Cp and the next clutch Cn to the engaged state. With the above, transmission control in the first control mode (power on shift up control) is finished.

Note here that a driver who is used to a manual transmission may unconsciously perform a blipping operation that temporarily closes the accelerator during an up-shift or a blipping operation that temporarily opens the accelerator during a down-shift even though they are unnecessary in a twin-clutch type motorcycle 1. For example, when a blipping operation that closes the accelerator is performed in the first control mode (power on shift up control), the output torque of the engine 20 drops, which may cause a change from the driving state to the driven state and thus a shock. Further, when a blipping operation that opens the accelerator is performed in the fourth control mode (power off shift down control), an output torque of the engine 20 increases, which may cause a change from the driven state to the driving state and thus a shock. Note that a driving state refers to a state in which an output torque from the engine 20 to the torque transmission path is smaller than a load torque input from the torque transmission path to the engine 20, and the driven state refers to the opposite state.

Note that, in the present preferred embodiment, control to be described below is executed in order to prevent occurrence of a shock when a blipping operation is performed in a gear change period.

FIG. 9 is a block diagram showing an example of a functional structure of the control apparatus 10. The control apparatus 10 includes a transmission control unit 51, an engine control unit 53, a target value determination unit 55, and a change suppression unit 59. Further, the engine control unit 53 includes an opening degree determination unit 57. The respective units of the control apparatus 10 are implemented by the CPU of the control apparatus 10 executing programs stored in the memory.

Upon input of a transmission instruction from the shift switch 19*f*, the transmission control unit 51 executes the transmission control, and drives the clutch actuators 49A, 49B and the shift actuator 39 (see FIGS. 5 to 7). Further, the transmission control unit 51 calculates the target torque capacities of the clutches 40A, 40B and an inertia torque used at the inertia phase based on the target engine torque supplied from the target value determination unit 55.

The engine control unit 53 drives the fuel injection unit 22, the throttle actuator 23, and the ignition plug 24 provided in the engine 20 such that an actual output torque of the engine 20 becomes closer to the target engine torque supplied from the target value determination unit 55. For example, the throttle opening degree adjusted by the throttle actuator 23 is increased in order to increase the output torque of the engine 20. Meanwhile, the throttle opening degree adjusted by the throttle actuator 23 is decreased in order to decrease the output torque of the engine 20. Further, the amount of fuel injected by the fuel injection unit 22 may be decreased or the ignition timing of the ignition plug 24 may be delayed.

Specifically, the opening degree determination unit 57 included in the engine control unit 53 determines the target throttle opening degree in accordance with the target engine torque supplied from the target value determination unit 55, and drives the throttle actuator 23 provided in the engine 20. For example, the target throttle opening degree has a linear relationship with the target engine torque. Further, the opening degree determination unit 57 reduces a time rate of changing of the throttle opening degree in response to a reduction instruction from the change suppression unit 59.

The target value determination unit 55 determines the target engine torque, based on the accelerator operation amount input from the accelerator sensor 19*g*, and supplies the target engine torque to the transmission control unit 51 and the engine control unit 53. For example, with reference to a map stored in a memory that correlates an accelerator operation amount and a target engine torque, the target value determination unit 55 determines the target engine torque. Further, the target value determination unit 55 sets the inertia torque supplied from the transmission control unit 51 as the target engine torque at the inertia phase.

When the throttle opening degree is changing toward a boundary value between the driving state and the driven state in a gear change period, the change suppression unit 59 outputs a reduction instruction to the engine control unit 53 to reduce the time rate of changing of the throttle opening degree. For example, the change suppression unit 59 may output a reduction instruction when the throttle opening degree is changed to become closer to the boundary value than a predetermined value in a gear change period, or may always output a reduction instruction to the engine control unit 53 when the throttle opening degree is changing toward the boundary value in a gear change period. Note that although a reduction instruction is output based on a change in the throttle opening degree in this example, this is not limiting, and a reduction instruction may be output based on a change in the accelerator opening degree.

Figure 10A:
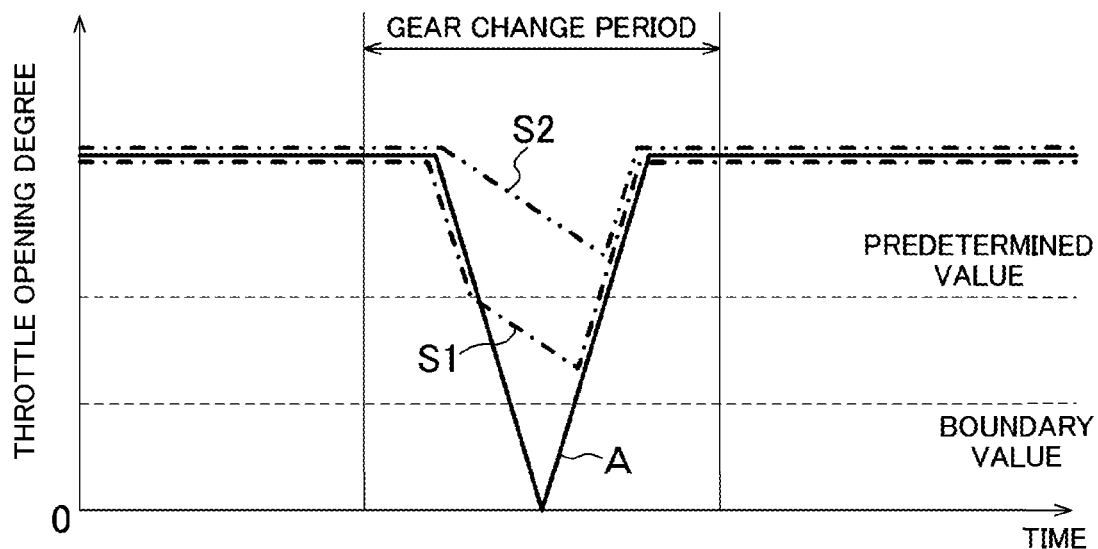
FIG. 10A shows an example of a change as time passes in a throttle opening degree in the first control mode.
Figure 10B:
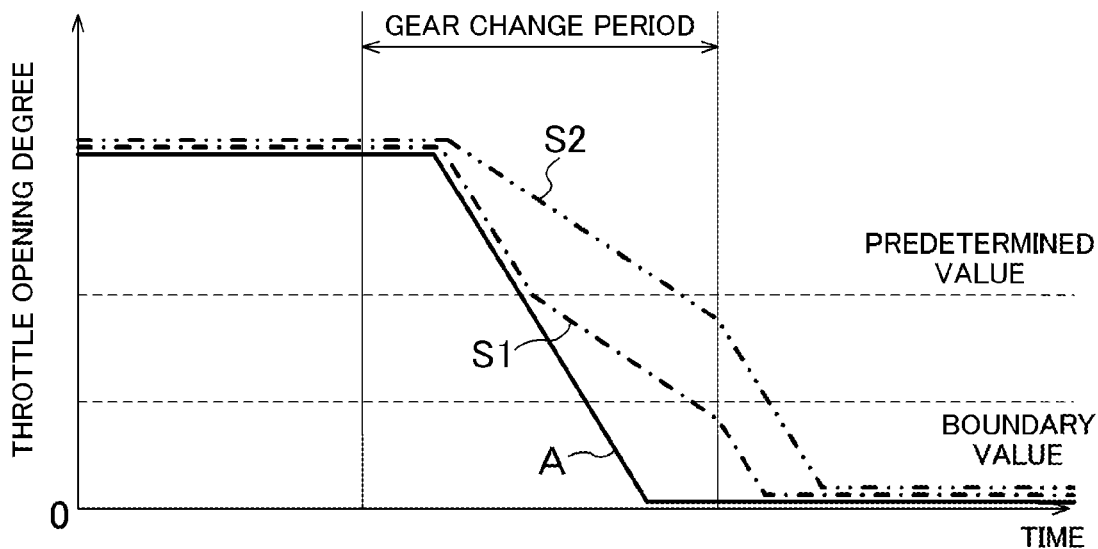
FIG. 10B shows an example of a change as time passes in a throttle opening degree in the first control mode.

FIGS. 10A and 10B show an example of a change as time passes in the throttle opening degree in the first control mode (power on shift up control). In these diagrams, the solid line indicates the accelerator opening degree A, the alternate long and short dash line indicates the throttle opening degree S1 in a first example, and the long dashed double-short dashed line indicates the throttle opening degree S2 in a second example. Further, in these diagrams, a side where the throttle opening degree is greater than the boundary value corresponds to the driving state, and a side where the throttle opening degree is smaller than the boundary value corresponds to the driven state. FIG. 10A shows a case in which a driver performs a blipping operation that temporarily closes the accelerator in a gear change period, and FIG. 10B shows a case in which a driver closes the accelerator in a gear change period with an intention of deceleration.

Basically, the throttle opening degrees S1, S2 follow the accelerator opening degree A, however, when the accelerator opening degree A is closed from the power-on state (the driving state) in a gear change period, a delay is caused in following the accelerator opening degree A. That is, when the throttle opening degrees S1, S2 decrease from the driving state in a gear change period, the decreasing time rates of changing are reduced. Note that when the throttle opening degrees S1, S2 further increase from the driving state in a gear change period, the increasing time rates of changing are not reduced in the present preferred embodiment. However, this is not limiting, and increasing time rates of changing may be reduced.

As shown in FIG. 10A, during a gear change period, when the throttle opening degree S1 is greater than a predetermined value that is set on the driving state side relative to the boundary value, the throttle opening degree S1 follows the accelerator opening degree A similarly to a case outside a gear change period, and when the throttle opening degree S2 is smaller than the predetermined value, the decreasing time rate of changing of the throttle opening degree S1 is reduced. In other words, during a gear change period, the decreasing time rate of changing of the throttle opening degree S1 is reduced when the throttle opening degree S1 becomes closer to the boundary value than a predetermined distance away from the boundary value. This, however, is not limiting, and the decreasing changing rate per time may be always reduced in the driving state during a gear change period.

As described above, even when a blipping operation that temporarily closes the accelerator from the power-on state (the driving state) is performed in a gear change period, the decreasing time rates of changing of the throttle opening degrees S1, S2 are reduced, thus it is possible to prevent occurrence of a shock due to the throttle opening degrees S1, S2 exceeding the boundary value.

In the second control mode (power on shift down control), it is expected that a blipping operation that temporarily further opens the accelerator from the power-on state (driving state) is performed. However, as the throttle opening degree is changing so as to depart from the boundary value, a shock due to the throttle opening degree exceeding the boundary value will not occur.

When a driver closes the accelerator in a gear change period with an intention of deceleration, as shown in FIG. 10B, the throttle opening degrees S1, S2 decrease as the accelerator opening degree A decreases. In the above, the throttle opening degrees S1, S2 are delayed in following the accelerator opening degree A as the decreasing time rate of changing is reduced. Note here that as to the throttle opening degree S1 in the first example, as the decreasing time rate of changing is reduced only in the range between a predetermined value and the boundary value, a period until the throttle opening degree S1 in the first example becomes equal to a value corresponding to the accelerator opening degree A is shorter than that with the throttle opening degree S2 in the second example.

As described above, reducing the decreasing time rate of changing only in the range between a predetermined value and the boundary value, like in the first example, is preferable to the second example in view of the throttle opening degree S1 is made to follow the accelerator opening degree A when an acceleration operation other than a blipping operation is performed in a gear change period.

Figure 11A:
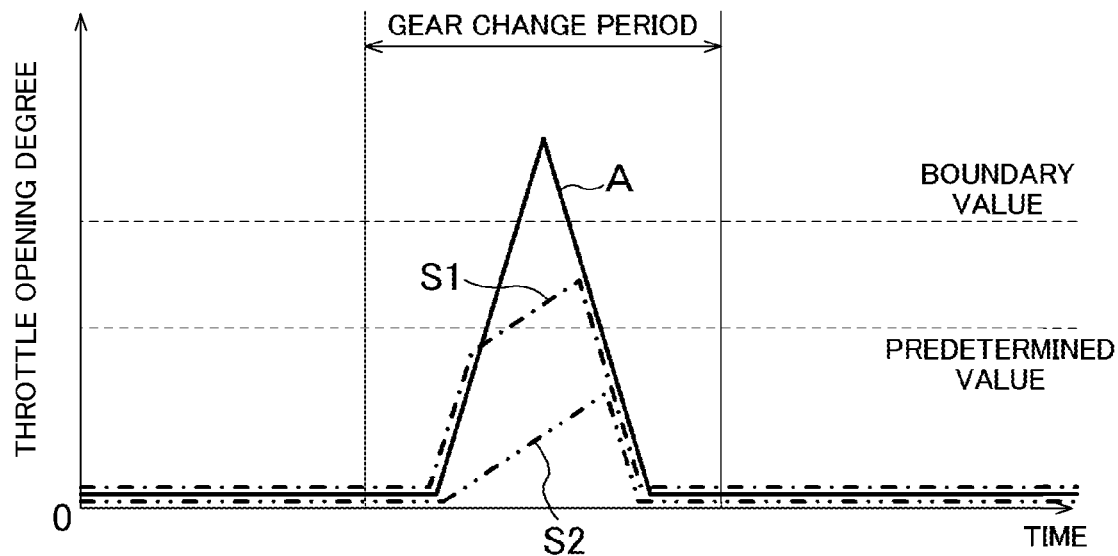
FIG. 11A shows an example of a change as time passes in a throttle opening degree in the fourth control mode.
Figure 11B:
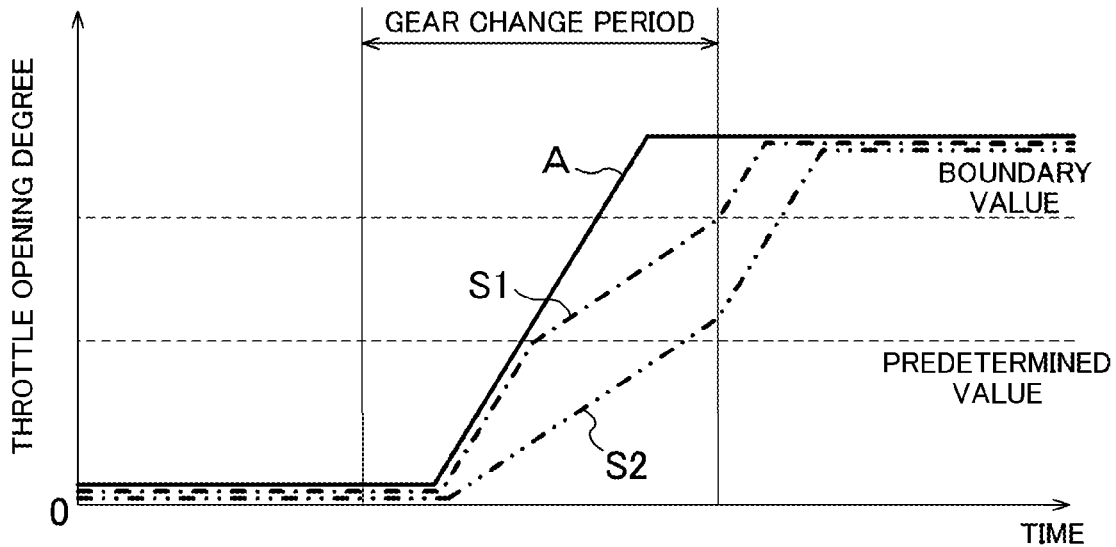
FIG. 11B shows an example of a change as time passes in a throttle opening degree in the fourth control mode.

FIGS. 11A and 11B show an example of a change as time passes in the throttle opening degree in the fourth control mode (power off shift down control). In these diagrams, the solid line indicates the accelerator opening degree A, the alternate long and short dash line indicates the throttle opening degree S1 in the first example, and the long dashed double-short dashed line indicates the throttle opening degree S2 in the second example. Further, in these diagrams, a side where the throttle opening degree is greater than the boundary value corresponds to the driving state, and a side where the throttle opening degree is smaller than the boundary value corresponds to the driven state. FIG. 11A shows a case in which a driver performs a blipping operation that temporarily opens the accelerator in a gear change period, and FIG. 11B shows a case in which a driver opens the accelerator in a gear change period with an intention of accelerating.

Although the throttle opening degrees S1, S2 basically follow the accelerator opening degree A, a delay is caused in following the accelerator opening degree A when the accelerator opening degree A is opened from a power-off state (the driven state) in a gear change period. That is, the increasing time rates of changing of the throttle opening degrees S1, S2 increasing from the driven state in a gear change period are reduced. Note that although the decreasing time rates of changing of the throttle opening degrees S1, S2 are not reduced when the throttle opening degrees S1, S2 further decrease from the driven state in a gear change period in the present preferred embodiment, this is not limiting, and the decreasing time rates of changing may be reduced.

As shown in FIG. 11A, during a gear change period, when the throttle opening degree S1 is smaller than a predetermined value set on the driven state side relative to the boundary value, the throttle opening degree S1 follows the accelerator opening degree A similarly to a case of outside the gear change period, and when the throttle opening degree S1 is greater than the predetermined value, the increasing time rate of changing of the throttle opening degree S1 is reduced. In other words, during a gear change period, the increasing time rate of changing of the throttle opening degree S1 is reduced when the throttle opening degree S1 becomes closer to the boundary value than a predetermined distance away from the boundary value. This, however, is not limiting, the increasing time rate of changing may be always reduced in the driven state during a gear change period, similar to the throttle opening degree S2.

As described above, even when a blipping operation that temporarily opens the accelerator from the power-off state (the driven state) is performed in a gear change period, as the increasing time rates of changing of the throttle opening degrees S1, S2 are reduced, it is possible to prevent occurrence of a shock due to the throttle opening degrees S1, S2 exceeding the boundary value.

In the third control mode (power off shift up control), it is not expected that a blipping operation that temporarily further closes the accelerator from the power-off state (the driven state) is performed or blipping operation is performed as it is not possible to further close the accelerator. Therefore, a shock due to the throttle opening degree exceeding the boundary value will not occur.

Further, as shown in FIG. 11B, when a driver opens the accelerator in a gear change period with an intention of acceleration, the throttle opening degrees S1, S2 increase as the accelerator opening degree A increases. In the above, as the increasing time rates of changing of the throttle opening degrees S1, S2 are reduced, a delay is caused in following the accelerator opening degree A. Note here that as to the throttle opening degree S1 in the first example, as the increasing time rate of changing is reduced only in the range between a predetermined value and the boundary value, a period until the throttle opening degree S1 in the first example reaches a value corresponding to the accelerator opening degree A is shorter than that for the throttle opening degree S2 in the second example.

As described above, reducing the increasing time rate of changing only in the range between a predetermined value and the boundary value, like in the first example, is preferable to the second example in view of that the throttle opening degree S1 is made following the accelerator opening degree A when an acceleration operation other than a blipping operation is performed in a gear change period.

Figure 12:
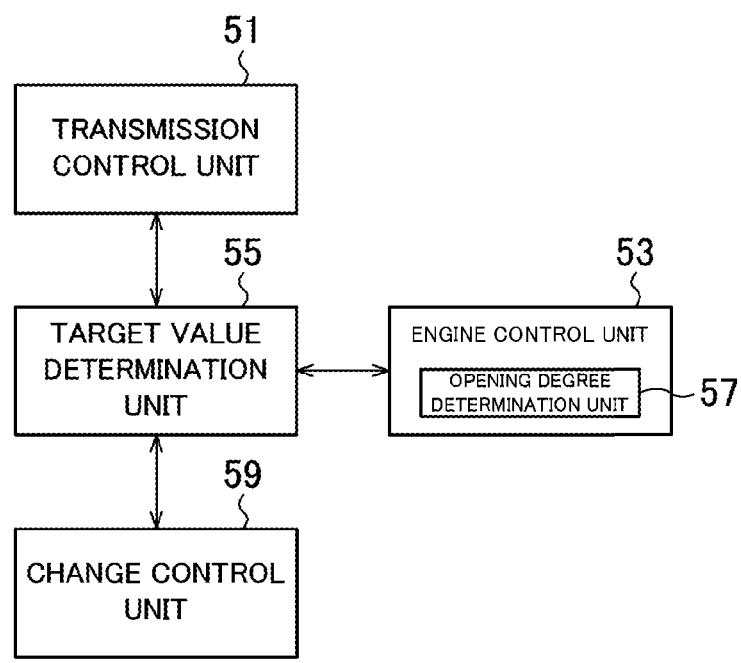
FIG. 12 is a block diagram showing a modified example of a functional structure of a control apparatus.

Note that the present preferred embodiment is not limiting, and the transmission control unit 51 may output a reduction instruction to the target value determination unit 55 to reduce the time rate of changing of the target engine torque when the target engine torque is changing toward the boundary value between the driving state and the driven state in a gear change period, as shown in FIG. 12, for example. This also can produce an effect same as that with the above mentioned preferred embodiment.

Figure 13:
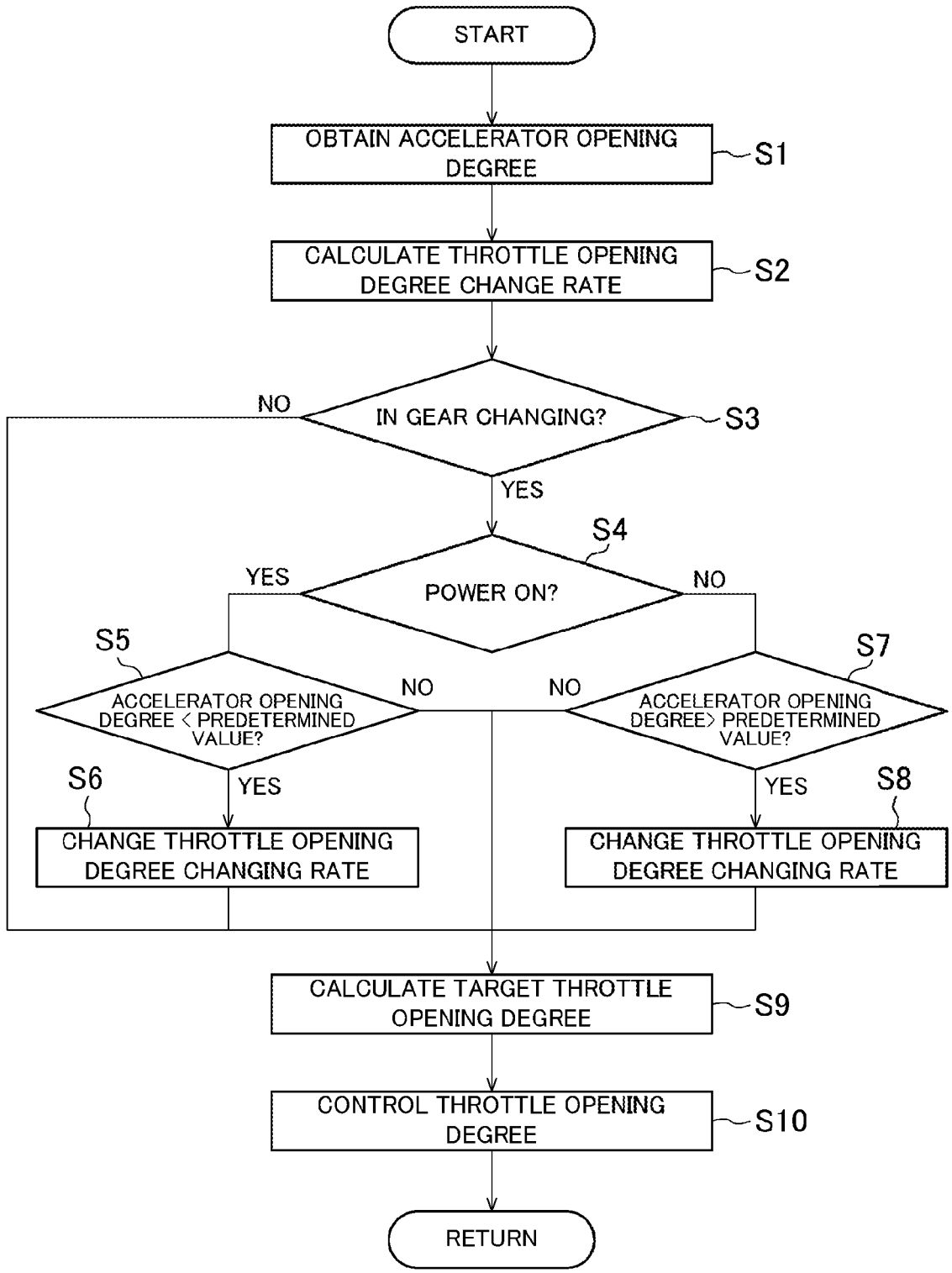
FIG. 13 is a flowchart showing an example of an operation of a control apparatus.

FIG. 13 is a flowchart showing an example of operation of the control apparatus 10. The processing shown in the flowchart is executed for every predetermined period.

At S1, the target value determination unit 55 obtains the accelerator opening degree from the accelerator sensor 19g. At S2, the change suppression unit 59 calculates the time rate of changing of the throttle opening degree. At S3, the transmission control unit 51 determines whether or not transmission control is being executed, if transmission control is being executed (S3: YES), proceed to S4, then determine whether or not it is in the power-on state. Whether or not it is in the power-on state is determined based on the map shown in FIG. 14, for example. When the throttle opening degree is greater than the reference value obtained from the map, based on the engine rotation speed, it is determined that it is in the power-on state, meanwhile, when the throttle opening degree is smaller than the reference value, it is determined that it is not in the power-on state (that is, in the power-off state). This map can be prepared based on a result of experiments conducted in advance, for example.

In case it is in the power-on state (S4: YES), the change suppression unit 59, proceeds to S5, and determines whether or not the accelerator opening degree is smaller than a predetermined value. That is, the change suppression unit 59 determines whether or not the accelerator opening degree A is closer to the boundary value and getting smaller than a predetermined value, as shown in FIGS. 10A and 10B. Whether the accelerator opening degree gets smaller than a predetermined value or not is determined based on the map shown in FIG. 15, for example. That is, whether or not the accelerator opening degree gets smaller than a predetermined value obtained from the map based on the engine rotation speed is determined. This map can be prepared based on a result of experiments conducted in advance, for example.

When the accelerator opening degree is smaller than the predetermined value (S5: YES), the change suppression unit 59, proceeds to S6, and reduces the time rate of changing when the throttle opening degree decreases. The change suppression unit 59 may reduce the time rate of changing not only when the throttle opening degree decreases but also when it increases. Note that although the time rate of changing of the throttle is reduced when the accelerator opening degree is smaller than a predetermined value in this example, this is not limiting, and the time rate of changing of the throttle may be reduced when the throttle opening degree is smaller than a predetermined value.

Meanwhile, at the power-off state (S4: NO), the change suppression unit 59, proceeds to S7, and determines whether or not the accelerator opening degree is greater than a predetermined value. That is, the change suppression unit 59 determines whether or not the accelerator opening degree A exceeds a predetermined value to be closer to the boundary value, as shown in FIGS. 11A and 11B. Whether the accelerator opening degree exceeds a predetermined value or not is determined based on the map shown in FIG. 16, for example. That is, whether or not the accelerator opening degree exceeds a predetermined value obtained from the map based on the engine rotation speed is determined. This map can be prepared based on a result of experiments conducted in advance, for example.

When the accelerator opening degree exceeds the predetermined value (S7: YES), the change suppression unit 59, proceeds to S8, and reduces the time rate of changing when the throttle opening degree increases. The change suppression unit 59 may reduce the time rate of changing not only when the throttle opening degree increases but also when it decreases. Note that, in the present preferred embodiment, although the time rate of changing of the throttle opening degree is reduced when the accelerator opening degree exceeds the predetermined value, this is not limiting, the time rate of changing of the throttle opening degree may be reduced when the throttle opening degree exceeds a predetermined value.

After S6 or S8, the opening degree determination unit 57 determines the target throttle opening degree at S9, and the engine control unit 53 drives the throttle actuator 23 in accordance with the target throttle opening degree at S10. When transmission control is not being executed at S3, when the accelerator opening degree is equal to or larger than the predetermined value at S5, or when the accelerator opening degree is equal to or smaller than the predetermined value at S7, steps S9 and S10 are executed.

Note that, at S4, whether it is in the power-on state or the power-off state is determined. Although transmission control in the power-on state includes the first control mode (power on shift up control) and the second control mode (power on shift down control), it is expected that a blipping operation by a driver in the second control mode does not cause the throttle opening degree to become closer to the boundary value, as described above. Therefore, by reducing the decreasing time rate of changing of the throttle opening degree in the power-on state, it is possible to prevent occurrence of a shock due to a blipping operation by a driver in the first control mode. Similarly, although transmission control in the power-off state includes the third control mode (power off shift up control) and the fourth control mode (power off shift down control), it is expected that a blipping operation by a driver in the third control mode does not cause the throttle opening degree to become closer to the boundary value, as described above. Therefore, by reducing the increasing time rate of changing of the throttle opening degree in the power-off state, it is possible to prevent occurrence of a shock due to a blipping operation by a driver in the fourth control mode.

Figure 17:
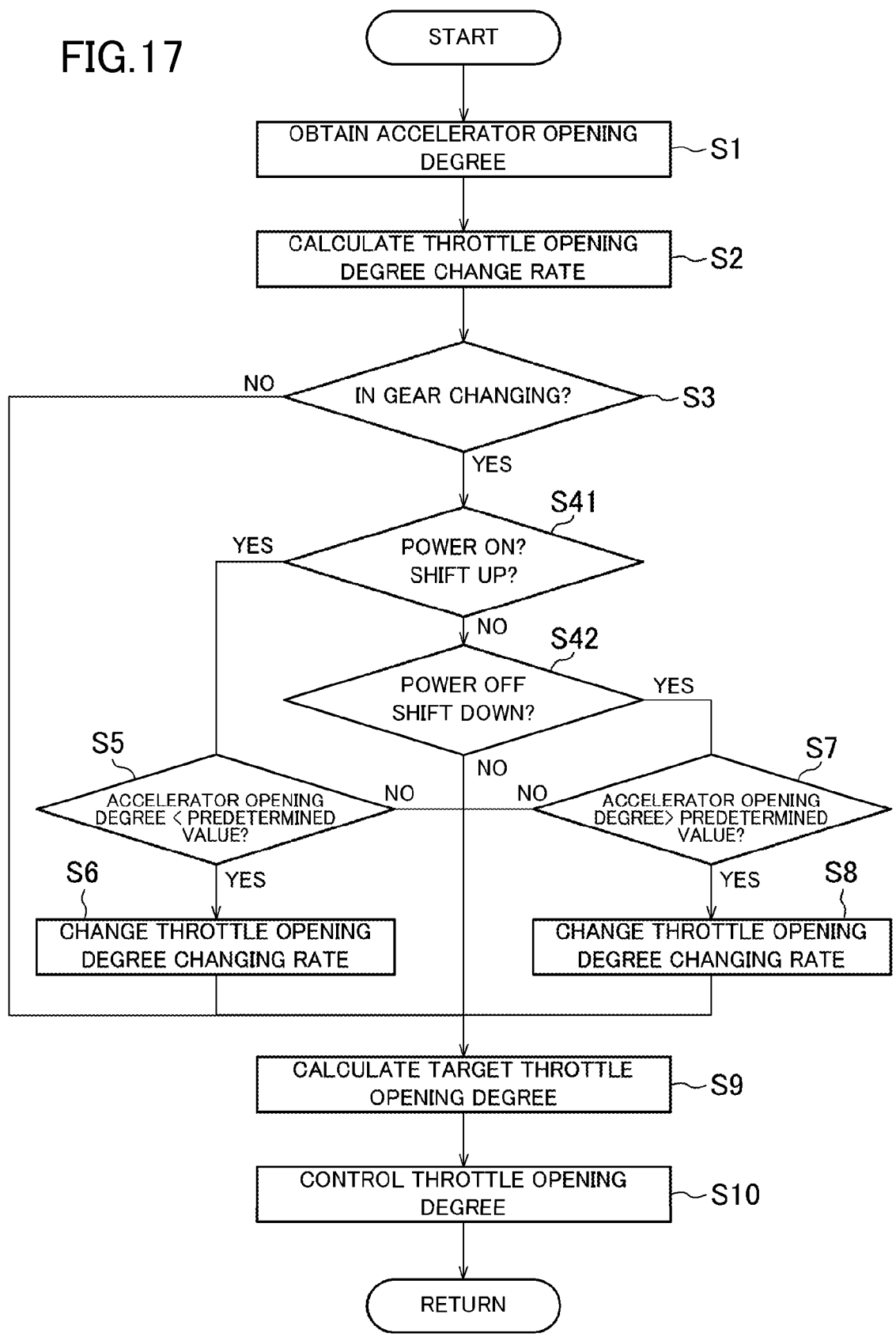
FIG. 17 is a flowchart showing a modified example of a functional structure of a control apparatus.

Note that this preferred embodiment is not limiting, as shown in FIG. 17, for example, the transmission control unit 51 may determine whether or not power on shift up control is being executed at S41 then may proceed to S5, and may determine whether or not power off shift down control is being executed at S42 then may proceed to S7. This as well can produce an effect similar to that with the above mentioned preferred embodiment.

Figure 18:
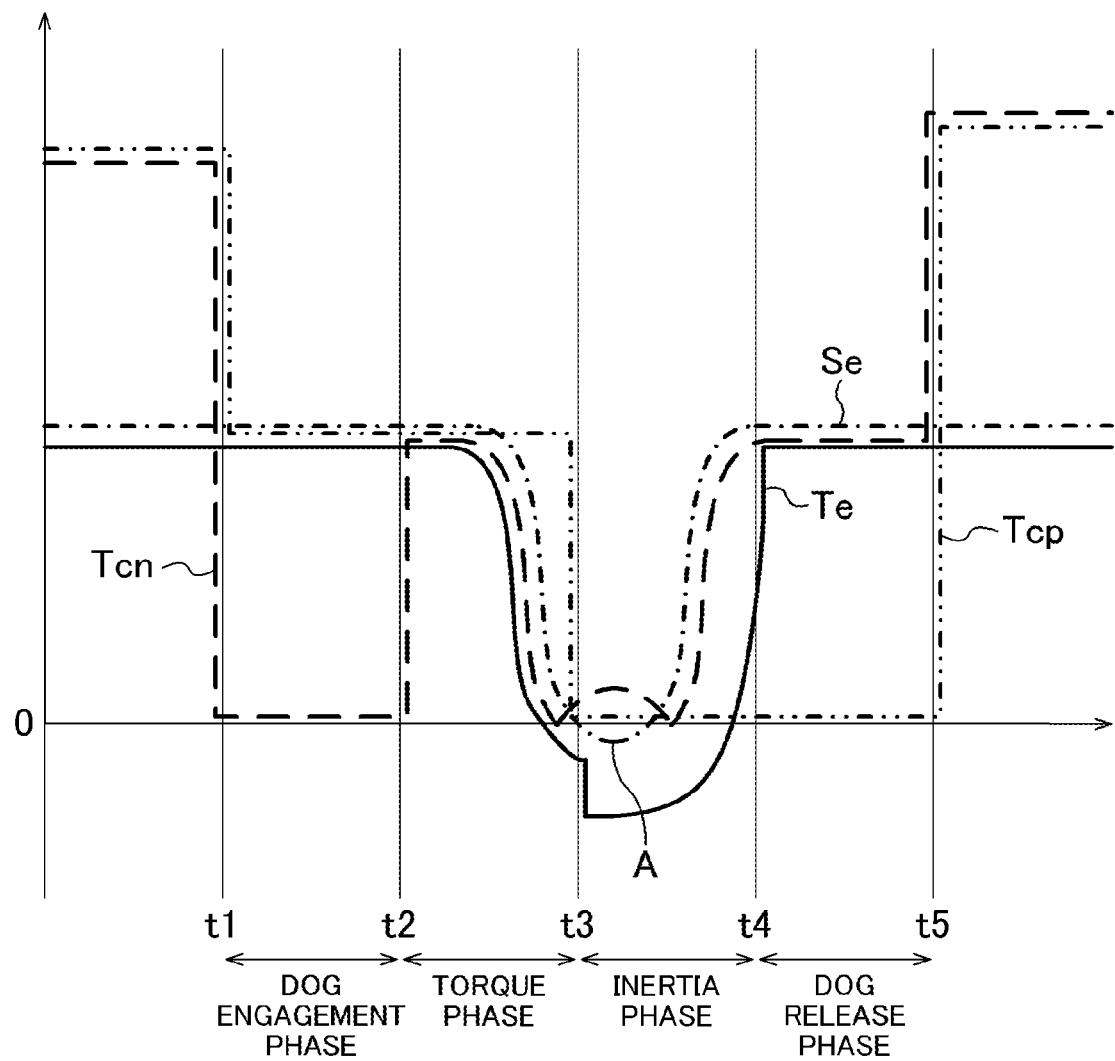
FIG. 18 is a time chart for a case in which a blipping operation is performed in the first control mode.

Below, details in a case in which a blipping operation that temporarily closes the accelerator is performed in the first control mode (power on shift up control), shown in FIG. 6A, will be described. FIG. 18 shows a time chart for a reference example in which the time rate of changing is not reduced by the change suppression unit 59. When the accelerator opening degree A temporarily decreases due to a blipping operation in a gear change period, the target engine torque Te and the target torque capacity Tcn of the next clutch Cn as well temporarily decrease. When the accelerator opening degree A decreases at the inertia phase, the target engine torque Te likely takes a negative value as the target engine torque Te is decreased to be smaller than a value determined based on the accelerator opening degree A at the inertia phase, and therefore, a shock is likely to be caused. That is, under transmission control in which the inertia phase is performed in a twin clutch-type motorcycle 1, a shock due to a blipping operation by a driver is likely to be caused. This is also true when a blipping operation that temporarily opens the accelerator is performed in the fourth control mode (power off shift down control).

FIG. 19 shows a time chart of a preferred embodiment in which the reduction of the time rate of changing is performed by the change suppression unit 59. In the present preferred embodiment, when the accelerator opening degree A temporarily decreases due to a blipping operation in a gear change period, decrease of the target engine torque Te is prevented. Therefore, even if the accelerator opening degree A decreases at the inertia phase, the target engine torque Te unlikely takes a negative value, and therefore, makes it unlikely to cause a shock.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle control apparatus mounted in a vehicle including an engine, two clutches mounted downstream of the engine to individually receive an output torque from the engine, two actuators to change torque capacities of the two clutches, two transmission mechanisms mounted downstream of the two clutches and including a common output shaft, an accelerator operated by a driver, and a throttle valve to adjust an amount of air flowing into the engine, the vehicle control apparatus being programmed to execute in a gear change period switching control to switch transmission paths of the output torque from one of the two clutches and two transmission mechanisms to another of the two clutches and two transmission mechanisms and to execute rotation control to change a rotation speed of the engine by ensuring a difference between the output torque and the torque capacities, the vehicle control apparatus comprising:

a target value determination unit programmed to determine a target value of the output torque based on an amount of operation of the accelerator; and a change suppression unit programmed to reduce a time rate of changing of the target value of the output torque in the gear change period with a decrease of the rotation speed of the engine, in case the target value of the output target is changed from a value greater than a load torque inputted from the transmission path to the engine toward a boundary value where the output torque is equal to the load torque.

2. The vehicle control apparatus according to claim 1, wherein, when the target value of the output torque becomes closer to the boundary value than a predetermined value, the change suppression unit reduces the time rate of changing of the target value of the output torque.

3. The vehicle control apparatus according to claim 1, further comprising an engine control unit programmed to change the rotation speed of the engine by adjusting the opening degree of the throttle valve.

4. A vehicle including the vehicle control apparatus according to claim 1.

5. A motor including the vehicle control apparatus according to claim 1.

6. A vehicle control apparatus mounted in a vehicle including an engine, two clutches mounted downstream of the engine to individually receive an output torque from the engine, two actuators to change torque capacities of the two clutches, two transmission mechanisms mounted downstream of the two clutches and including a common output shaft, an accelerator operated by a driver, and a throttle valve to adjust an amount of air flowing into the engine, the vehicle control apparatus being programmed to execute in a gear change period switching control to switch transmission paths of the output torque from one of the two clutches and two transmission mechanisms to another of the two clutches and two transmission mechanisms and to execute rotation control to change a rotation speed of the engine by ensuring a difference between the output torque and the torque capacities, the vehicle control apparatus comprising:

a target value determination unit programmed to determine a target value of the output torque based on an amount of operation of the accelerator; and a change suppression unit programmed to reduce a time rate of changing of the target value of the output torque in the gear change period with an increase of the rotation speed of the engine, in case the target value of the output target is changed from a value smaller than a load torque inputted from the transmission path to the engine toward a boundary value where the output torque is equal to the load torque.

7. The vehicle control apparatus according to claim 6, wherein, when the target value of the output torque becomes closer to the boundary value than a predetermined value, the change suppression unit reduces the time rate of changing of the target value of the output torque.

8. The vehicle control apparatus according to claim 6, further comprising an engine control unit programmed to change the rotation speed of the engine by adjusting the opening degree of the throttle valve.

9. A vehicle including the vehicle control apparatus according to claim 6.

10. A motor including the vehicle control apparatus according to claim 6.

11. A vehicle control apparatus mounted in a vehicle including an engine, two clutches mounted downstream of the engine to individually receive an output torque from the engine, two actuators to change torque capacities of the two clutches, two transmission mechanisms mounted downstream of the two clutches and including a common output shaft, an accelerator operated by a driver, and a throttle valve to adjust an amount of air flowing into the engine, the vehicle control apparatus being programmed to execute in a gear change period switching control to switch transmission paths of the output torque from one of the two clutches and two transmission mechanisms to another of the two clutches and two transmission mechanisms and to execute rotation control to change a rotation speed of the engine by ensuring a difference between the output torque and the torque capacities, the vehicle control apparatus comprising:

an opening degree determination unit programmed to determine an opening degree of the throttle valve based on an amount of operation of the accelerator; and a change suppression unit programmed to reduce a time rate of changing of the opening degree of the throttle valve in the gear change period with a decrease of the rotation speed of the engine, in case the opening degree of the throttle valve is changed from a value at which the output torque is greater than a load torque inputted from the transmission path to the engine toward a boundary value where the output torque is equal to the load torque.

12. The vehicle control apparatus according to claim 11, wherein, when the opening degree of the throttle valve becomes closer to the boundary value than a predetermined value, the change suppression unit reduces the time rate of changing of the opening degree of the throttle valve.

13. The vehicle control apparatus according to claim 11, wherein, when an accelerator operation amount becomes closer to the boundary value than a predetermined value, the change suppression unit reduces the time rate of changing of the opening degree of the throttle valve.

14. The vehicle control apparatus according to claim 11, further comprising an engine control unit programmed to change the rotation speed of the engine by adjusting the opening degree of the throttle valve.

15. A vehicle including the vehicle control apparatus according to claim 11.

16. A vehicle control apparatus mounted in a vehicle including an engine, two clutches mounted downstream of the engine to individually receive an output torque from the engine, two actuators to change torque capacities of the two clutches, two transmission mechanisms mounted downstream of the two clutches and including a common output shaft, an accelerator operated by a driver, and a throttle valve to adjust an amount of air flowing into the engine, the vehicle control apparatus being programmed to execute in a gear change period switching control to switch transmission paths of the output torque from one of the two clutches and two transmission mechanisms to another of the two clutches and two transmission mechanisms and to execute rotation control to change a rotation speed of the engine by ensuring a difference between the output torque and the torque capacities, the vehicle control apparatus comprising:

an opening degree determination unit programmed to determine an opening degree of the throttle valve based on an amount of operation of the accelerator; and a change suppression unit programmed to reduce a time rate of changing of the opening degree of the throttle valve in the gear change period with an increase of the rotation speed of the engine, in case the opening degree of the throttle valve is changed from a value at which the output torque is smaller than a load torque inputted from the transmission path to the engine toward a boundary value where the output torque is equal to the load torque.

17. The vehicle control apparatus according to claim 16, wherein, when the opening degree of the throttle valve becomes closer to the boundary value than a predetermined value, the change suppression unit reduces the time rate of changing of the opening degree of the throttle valve.

18. The vehicle control apparatus according to claim 16, wherein, when an accelerator operation amount becomes closer to the boundary value than a predetermined value, the change suppression unit reduces the time rate of changing of the opening degree of the throttle valve.

19. The vehicle control apparatus according to claim 16, further comprising an engine control unit programmed to change the rotation speed of the engine by adjusting the opening degree of the throttle valve.

20. A vehicle including the vehicle control apparatus according to claim 16.

* * * * *